(12) United States Patent
Hirosawa et al.

(10) Patent No.: US 6,302,972 B1
(45) Date of Patent: Oct. 16, 2001

(54) NANOCOMPOSITE MAGNET MATERIAL AND METHOD FOR PRODUCING NANOCOMPOSITE MAGNET

(75) Inventors: Satoshi Hirosawa, Otsu; Hirokazu Kanekiyo, Kyoto; Yasutaka Shigemoto, Ibaraki, all of (JP)

(73) Assignee: Sumitomo Special Metals Co., LTD (JP)

( * ) Notice: Subject to any disclaimer, the term of this patent is extended or adjusted under 35 U.S.C. 154(b) by 0 days.

(21) Appl. No.: 09/455,469

(22) Filed: Dec. 6, 1999

(30) Foreign Application Priority Data

| Dec. 7, 1998 | (JP) | ................................................. | 10-346700 |
| Dec. 15, 1998 | (JP) | ................................................. | 10-356286 |
| Sep. 6, 1999 | (JP) | ................................................. | 11-291439 |

(51) Int. Cl.$^7$ ..................................................... H01F 1/057
(52) U.S. Cl. ......................... 148/302; 148/101; 148/104; 148/121; 164/463; 164/477; 252/62.55; 420/83; 420/121
(58) Field of Search ................................... 148/101, 104, 148/121, 302; 164/463, 477; 252/62.55; 419/44; 420/83, 121

(56) References Cited

U.S. PATENT DOCUMENTS

| 4,533,408 | 8/1985 | Koon . |
| 5,022,939 | 6/1991 | Yajima et al. . |
| 5,049,208 | 9/1991 | Yajima et al. . |
| 5,209,789 | 5/1993 | Yoneyama et al. . |
| 5,449,417 | * | 9/1995 | Shimizu et al. ........................ 148/302 |

FOREIGN PATENT DOCUMENTS 2000-234137-A * 8/2000 (JP) .

OTHER PUBLICATIONS

Hirosawa et al., "Magnetic Properties and Microstructure of As–Spun Fe$_3$B/Nd$_2$Fe$_{14}$B Nanocomposite Permanent Magnets Produced by Low–Speed Melt Spinning Technique", 15$^{th}$ Int. Workshop on Rare Earth Magnets KV 112 and Their Applications, Dresden, Germany, Aug. 30–Sep. 3, 1998, (10 pages).

Murakami et al., "Highly Efficient Double Layer IPM (Interior Permanent Magnet) Motor", Matsushita Technical Journal, vol. 44, No. 2, Apr. 1998, pp. 149–154.

* cited by examiner

*Primary Examiner*—John Sheehan
(74) *Attorney, Agent, or Firm*—Nixon Peabody LLP; Jeffrey L. Costellia

(57) ABSTRACT

An inventive material alloy for a nanocomposite magnet is represented by a general formula $Fe_{100-x-y}R_xB_y$, $Fe_{100-x-y-z}R_xB_yCo_z$, $Fe_{100-x-y-u}R_xB_yM_u$ or $Fe_{100-x-y-z-u}R_xB_yCo_zM_u$. R is a rare-earth element. 90 atomic percent or more of R is Pr and/or Nd, while equal to or larger than 0 atomic percent and less than 10 atomic percent of R is another lanthanoid and/or Y. M is at least one element selected from the group consisting of Al, Si, Ti, V, Cr, Mn, Ni, Cu, Ga, Zr, Nb, Mo, Hf, Ta, W, Pt, Pb, Au and Ag. The molar fractions x, y, z and u meet the inequalities of $2 \leq x \leq 6$, $16 \leq y \leq 20$, $0.2 \leq z \leq 7$ and $0.01 \leq u \leq 7$, respectively. The alloy includes a metastable phase Z represented by at least one of a plurality of Bragg reflection peaks observable by X-ray diffraction analysis. The at least one peak corresponds to a lattice spacing of 0.179 nm±0.005 nm. An intensity of the Bragg reflection peak represents 5 to 200 percent, both inclusive, of a maximum intensity of a halo pattern. An intensity of a (110) Bragg reflection peak of body-centered Fe represents less than 5 percent of the maximum intensity of the halo pattern.

16 Claims, 9 Drawing Sheets

NANOCOMPOSITE MAGNET MATERIAL AND METHOD FOR PRODUCING NANOCOMPOSITE MAGNET

BACKGROUND OF THE INVENTION

1. Field of the Invention

The present invention generally relates to a method for producing a permanent magnet as a composite of soft magnetic $Fe_3B$ and hard magnetic R—Fe—B fine grains (in this specification, such a magnet will be called a "nanocomposite magnet"). More particularly, the present invention relates to: magnet material alloy for use in producing the nanocomposite magnet; powder of the magnet material alloy; methods for preparing the magnet material alloy; methods for preparing the nanocomposite magnet powder; method for producing the nanocomposite magnet; and motor including the nanocomposite magnet.

2. Description of the Related Art

In an $Fe_3B/Nd_2Fe_{14}B$ nanocomposite magnet, soft magnetic $Fe_3B$ and hard magnetic $Nd_2Fe_{14}B$ crystallites are uniformly distributed and magnetically coupled to each other as a result of exchange interactions therebetween. Each of these crystallites is of a size on the order of several nanometers and such a magnet is a composite of these two types of crystalline phases. Thus, a magnet of this type is called a "nanocomposite magnet" with a "nanocomposite structure".

A nanocomposite magnet exhibits excellent magnetic properties; although the magnet contains the soft magnetic crystallites, those soft magnetic crystallites have been magnetically coupled to the hard magnetic ones. In addition, since the soft magnetic crystallites contained do not include any rare-earth elements such as neodymium (Nd), the total volume fraction of rare-earth elements is small. Accordingly, the magnet can be supplied constantly at a reduced production cost.

The nanocomposite magnet of this type is produced by rapidly quenching a molten material alloy to form an amorphous alloy and then heat-treating the amorphous alloy to generate the nanometer-scaled crystallites. In general, the amorphous alloy is produced by a melt-spinning technique such as a single roller method. According to the melt-spinning technique, a melt of a material alloy is injected through an orifice to the outer circumference of a rotating chill roller, e.g., a water cooling drum, to come into contact with the roller surface for just a short period of time, thereby rapidly cooling and solidifying the material alloy. In this method, the cooling rate is controllable by adjusting the surface velocity of the rotating chill roller, for example.

The alloy that has been solidified and detached from the chill roller, i.e., melt-spun alloy, is in the shape of a ribbon (or strip) elongated along the circumference of the roller. The ribbon of alloy gets crushed into flakes by a crusher and then pulverized into finer powder particles by a mechanical grinder.

Thereafter, the powder particles are heat-treated to crystallize. As a result, the $Fe_3B$ and $Nd_2Fe_{14}B$ crystallites are grown and magnetically coupled together through the exchange interactions.

The type of a metal structure resulting from the heat treatment plays a key role in improving the properties of the permanent magnet as a final product. The conventional heat treatment process, however, has various drawbacks in view of the controllability and reproducibility thereof. Specifically, since a large quantity of heat is generated in a short time during the crystallization of the amorphous material alloy, it is difficult for the heat treatment system to control the temperature of the processed alloy. If a great amount of material alloy powder were annealed at a time, in particular, then the temperature of the alloy powder would almost always be out of control. Thus, according to the conventional technique, the heat treatment should be performed on just a small amount of material powder at a time and the resultant processing rate (i.e., the amount of powder processable per unit time) is far from being satisfactory. Such a low processing rate constitutes a serious obstacle to mass-production of magnet powder.

SUMMARY OF THE INVENTION

An object of the present invention is providing a material alloy (powder) for a nanocomposite magnet, which is suitably applicable to preparing efficiently and reproducibly magnet powder with a nanometer-scaled homogeneous metal structure by lowering the heat of reaction generated during crystallization of the alloy.

Another object of the present invention is providing a method for preparing nanocomposite magnet powder with excellent magnetic properties and a method for producing a nanocomposite magnet out of the powder.

Still another object of the present invention is providing a motor including such a nanocomposite magnet with the excellent properties.

An inventive material alloy for a nanocomposite magnet is represented by a general formula $Fe_{100-x-y}R_xB_y$, $Fe_{100-x-y-z}R_xB_yCo_z$, $Fe_{100-x-y-u}R_xB_yM_u$ or $Fe_{100-x-y-z-u}R_xB_yCo_zM_u$. R is a rare-earth element. 90 atomic percent or more of R is Pr and/or Nd, while equal to or larger than 0 atomic percent and less than 10 atomic percent of R is another lanthanoid and/or Y. M is at least one element selected from the group consisting of Al, Si, Ti, V, Cr, Mn, Ni, Cu, Ga, Zr, Nb, Mo, Hf, Ta, W, Pt, Pb, Au and Ag. The molar fractions x, y, z and u meet the inequalities of $2 \leq x \leq 6$, $16 \leq y \leq 20$, $0.2 \leq z \leq 7$ and $0.01 \leq u \leq 7$ respectively. The alloy includes a metastable phase Z represented by at least one of a plurality of Bragg reflection peaks observable by X-ray diffraction analysis. The at least one peak corresponds to a lattice spacing of 0.179 nm±0.005 nm. An intensity of the Bragg reflection peak represents 5 to 200 percent, both inclusive, of a maximum intensity of a halo pattern. An intensity of a (110) Bragg reflection peak of body-centered Fe represents less than 5 percent of the maximum intensity of the halo pattern.

An inventive material alloy powder for a nanocomposite magnet is represented by a general formula $Fe_{100-x-y}R_xB_y$, $Fe_{100-x-y-z}R_xB_yCo_z$, $Fe_{100-x-y-u}R_xB_yM_u$ or $Fe_{100-x-y-z-u}R_xB_yCo_zM_u$. R is a rare-earth element. 90 atomic percent or more of R is Pr and/or Nd, while equal to or larger than 0 atomic percent and less than 10 atomic percent of R is another lanthanoid and/or Y. M is at least one element selected from the group consisting of Al, Si, Ti, V, Cr, Mn, Ni, Cu, Ga, Zr, Nb, Mo, Hf, Ta, W, Pt, Pb, Au and Ag. The molar fractions x, y, z and u meet the inequalities of $2 \leq x \leq 6$, $16 \leq y \leq 20$, $0.2 \leq z \leq 7$ and $0.01 \leq u \leq 7$, respectively. The powder includes a metastable phase Z represented by at least one of a plurality of Bragg reflection peaks observable by X-ray diffraction analysis. The at least one peak corresponds to a lattice spacing of 0.179 nm±0.005 nm. An intensity of the Bragg reflection peak represents 5 to 200 percent, both inclusive, of a maximum intensity of a halo pattern. An intensity of a (110) Bragg reflection peak of body-centered Fe represents less than 5 percent of the maximum intensity of the halo pattern.

An inventive method for preparing a material alloy for a nanocomposite magnet is adapted to prepare an alloy represented by a general formula $Fe_{100-x-y}R_xB_y$, $Fe_{100-x-y-z}R_xB_yCo_z$, $Fe_{100-x-y-u}R_xB_yM_u$ or $Fe_{100-x-y-z-u}R_xB_yCo_zM_u$. R is a rare-earth element. 90 atomic percent or more of R is Pr and/or Nd, while equal to or larger than 0 atomic percent and less than 10 atomic percent of R is another lanthanoid and/or Y. M is at least one element selected from the group consisting of Al, Si, Ti, V, Cr, Mn, Ni, Cu, Ga, Zr, Nb, Mo, Hf, Ta, W, Pt, Pb, Au and Ag. The molar fractions x,, y, z and u meets the inequalities of $2 \leq x \leq 6$, $16 \leq y \leq 20$, $0.2 \leq z \leq 7$ and $0.01 \leq u \leq 7$, respectively. The method includes the steps of forming a melt of the material alloy and rapidly solidifying the melt. A cooling rate of the alloy is adjusted in the rapid quenching and solidifying step such that the material alloy solidified includes a metastable phase Z represented by at least one of a plurality of Bragg reflection peaks observable by X-ray diffraction analysis. The at least one peak corresponds to a lattice spacing of 0.179 nm±0.005 nm. An intensity of the Bragg reflection peak represents 5 to 200 percent, both inclusive, of a maximum intensity of a halo pattern. An intensity of a (110) Bragg reflection peak of body-centered Fe represents less than 5 percent of the maximum intensity of the halo pattern.

In one embodiment of the present invention, the material alloy preparation method may further include the step of making powder out of the rapidly-solidified material alloy.

In another embodiment of the present invention, a cooling rate of the alloy is preferably defined within the range from $5 \times 10^4$ K/s to $5 \times 10^6$ K/s in the rapid quenching and solidifying step, and a temperature of the quenched alloy is preferably lower by 400 to 800° C. than a temperature $T_m$ of the molten alloy yet to be quenched.

In this particular embodiment, the rapid quenching and solidifying step is preferably performed within a low-pressure ambient.

Alternatively or additionally, an absolute pressure of the low-pressure ambient is preferably 50 kPa or less.

An inventive method for preparing nanocomposite magnet powder includes the step of preparing material alloy powder for a nanocomposite magnet. The powder is represented by a general formula $Fe_{100-x-y}R_xB_y$, $Fe_{100-x-y-z}R_xB_yCo_z$, $Fe_{100-x-y-u}R_xB_yM_u$ or $Fe_{100-x-y-z-u}R_xB_yCo_zM_u$. R is a rare-earth element. 90 atomic percent or more of R is Pr and/or Nd, while equal to or larger than 0 atomic percent and less than 10 atomic percent of R is another lanthanoid and/or Y. M is at least one element selected from the group consisting of Al, Si, Ti, V, Cr, Mn, Ni, Cu, Ga, Zr, Nb, Mo, Hf, Ta, W, Pt, Pb, Au and Ag. The molar fractions x, y, z and u meet the inequalities of $2 \leq x \leq 6$, $16 \leq y \leq 20$, $0.2 \leq z \leq 7$ and $0.01 \leq u \leq 7$, respectively. The powder includes a metastable phase Z represented by at least one of a plurality of Bragg reflection peaks observable by X-ray diffraction analysis. The at least one peak corresponds to a lattice spacing of 0.179 nm±0.005 nm. An intensity of the Bragg reflection peak represents 5 to 200 percent, both inclusive, of a maximum intensity of a halo pattern. An intensity of a (110) Bragg reflection peak of body-centered Fe represents less than 5 percent of the maximum intensity of the halo pattern. The method further includes the step of heat-treating the material alloy powder for the nanocomposite magnet, thereby crystallizing $Fe_3B$ and Fe—R—B compounds.

In one embodiment of the present invention, the step of preparing the material alloy powder for the nanocomposite magnet preferably includes the steps of: forming a melt of the material alloy; rapidly quenching and solidifying the melt; crushing the rapidly-solidified material alloy; and pulverizing the material alloy. In the rapid quenching and solidifying step, a cooling rate of the alloy is preferably defined within the range from $5 \times 10^4$ K/s to $5 \times 10^6$ K/s, and a temperature of the quenched alloy is preferably lower by 400 to 800° C. than a temperature $T_m$ of the molten alloy yet to be quenched.

An inventive method for producing a nanocomposite magnet includes the step of preparing material alloy powder for the nanocomposite magnet. The powder is represented by a general formula $Fe_{100-x-y}R_xB_y$, $Fe_{100-x-y-z}R_xB_yCo_z$, $Fe_{100-x-y-u}R_xB_yM_u$ or $Fe_{100-x-y-z-u}R_xB_yCo_zM_u$. R is a rare-earth element. 90 atomic percent or more of R is Pr and/or Nd, while equal to or larger than 0 atomic percent and less than 10 atomic percent of R is another lanthanoid and/or Y. M is at least one element selected from the group consisting of Al, Si, Ti, V, Cr, Mn, Ni, Cu, Ga, Zr, Nb, Mo, Hf, Ta, W, Pt, Pb, Au and Ag. The molar fractions x, y, z and u meet the inequalities of $2 \leq x \leq 6$, $16 \leq y \leq 20$, $0.2 \leq z \leq 7$ and $0.01 \leq u \leq 7$, respectively. The powder includes a metastable phase Z represented by at least one of a plurality of Bragg reflection peaks observable by X-ray diffraction analysis. The at least one peak corresponds to a lattice spacing of 0.179 nm±0.005 nm. An intensity of the Bragg reflection peak represents 5 to 200 percent, both inclusive, of a maximum intensity of a halo pattern. An intensity of a (110) Bragg reflection peak of body-centered Fe represents less than 5 percent of the maximum intensity of the halo pattern. The method further includes the steps of: heat-treating the material alloy powder for the nanocomposite magnet, thereby crystallizing $Fe_3B$ and Fe—R—B compounds; and molding the heat-treated material alloy powder.

In one embodiment of the present invention, the step of preparing the material alloy powder for the nanocomposite magnet preferably includes the steps of: forming a melt of the material alloy; rapidly quenching and solidifying the melt; crushing the rapidly-solidified material alloy; and pulverizing the material alloy. In the rapid quenching and solidifying step, a cooling rate of the alloy is preferably defined within the range from $5 \times 10^4$ K/s to $5 \times 10^6$ K/s, and a temperature of the quenched alloy is preferably lower by 400 to 800° C. than a temperature $T_m$ of the molten alloy yet to be quenched.

In this particular embodiment, the step of rapidly quenching and solidifying the melt is preferably performed within a low-pressure ambient.

In this case, an absolute pressure of the low-pressure ambient is preferably 50 kPa or less.

In a preferred embodiment, the step of molding the powder preferably includes producing a bonded magnet out of the heat-treated material alloy powder.

A motor according to the present invention includes a nanocomposite magnet produced by the inventive method for producing the nanocomposite magnet.

DESCRIPTION OF THE PREFERRED EMBODIMENTS

Figure 1A:
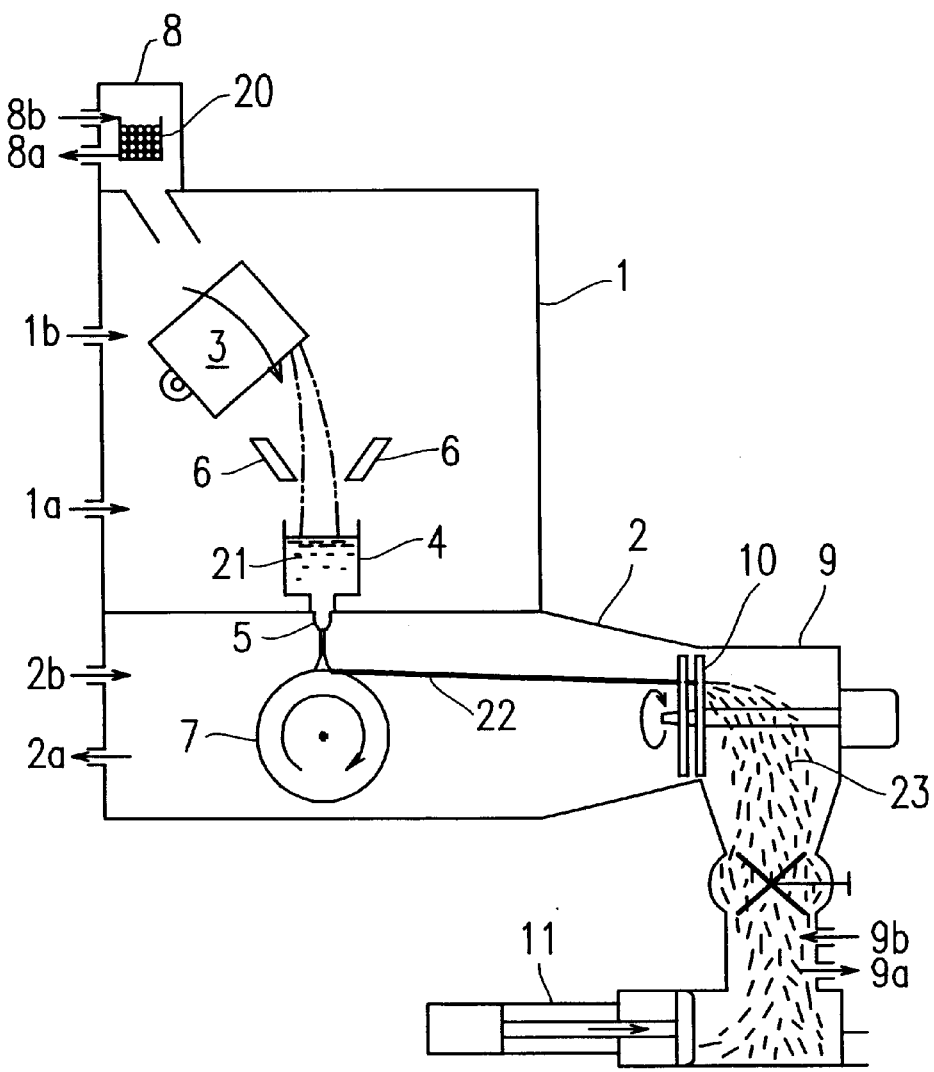
FIG. 1A is a cross-sectional view illustrating an exemplary overall arrangement of an apparatus for preparing a material alloy for nanocomposite magnet according to the present invention.

According to the present invention, a molten alloy for a nanocomposite magnet, which is represented by a general formula $Fe_{100-x-y}R_xB_y$, $Fe_{100-x-y-z}R_xB_yCo_z$, $Fe_{100-x-y-u}R_xB_yM_u$ or $Fe_{100-x-y-z-u}R_xB_yCo_zM_u$, is prepared and then rapidly quenched and solidified. In this general formula, R is a rare-earth element. 90 atomic percent or more of R is Pr and/or Nd, while equal to or larger than 0 atomic percent and less than 10 atomic percent of R is another lanthanoid and/or Y. M is at least one element selected from the group consisting of Al, Si, Ti, V, Cr, Mn, Ni, Cu, Ga, Zr, Nb, Mo, Hf, Ta, W, Pt, Pb, Au and Ag. And the molar fractions x, y, z and u meet the inequalities of $2 \leq x \leq 6$, $16 \leq y \leq 20$, $0.2 \leq z \leq 7$ and $0.01 \leq u \leq 7$, respectively. It will be described later why this composition is preferred.

The present inventors found that the molten alloy is preferably quenched and solidified at a cooling rate in the range from 533 $10^4$ K/s to $5 \times 10^6$ K/s. We also found that the alloy that had been rapidly cooled and solidified and the powder thereof were in a metallic glass state. Specifically, the quenched alloy or powder included a metastable phase Z represented by at least one of a plurality of Bragg reflection peaks observable by powder X-ray diffraction analysis, which corresponds to a lattice spacing of 0.179 nm±0.005 nm. An intensity of the Bragg reflection peak was in the range from 5 to 200 percent, both inclusive, of a maximum intensity of a halo pattern. And an intensity of a (110) Bragg reflection peak of body-centered Fe was less than 5 percent of the maximum intensity of the halo pattern.

If such a material alloy or powder thereof is heat-treated, then $Fe_3B$ and Fe—R—B fine grains crystallize, thereby creating a nanocomposite magnet structure with excellent magnetic properties.

We confirmed on the basis of the results of powder X-ray diffraction (XRD) analysis that the quenched material alloys according to the present invention had a metallic glass structure and showed no long-range order before the alloys were heat-treated to be crystallized. The results of experiments carried out by us revealed that the metallic glass alloys with the metastable phase Z can be formed by adjusting the cooling rate of the molten alloys within the above-specified range and that the alloys can exhibit excellent magnetic properties by being heat-treated after that.

A primary reason that a magnet produced from the metallic glass alloy according to the present invention exhibits excellent magnetic properties is believed to be the high-density dispersion of fine embryos of $Fe_3B$ crystals in the metallic glass alloy. Accordingly, when such an alloy is subjected to heat treatment, crystals grow from a great number of embryos (i.e., crystal nuclei) exhibiting a short-range order in the alloy, resulting in a nanometer-scaled and highly homogeneous crystal structure. In addition, since $Fe_3B$ crystals grow through extremely-short-range atomic diffusion, the $Fe_3B$ crystals can advantageously grow at a relatively low temperature.

$Fe_3B$ crystals grow at a temperature in the range from 590° C. to 600° C. As this crystallization advances, an increasingly large number of rare-earth element atoms such as Nd are ejected into surrounding regions. As a result, the composition of those regions is getting closer to $Nd_2Fe_{14}B$. Because of this, although $Nd_2Fe_{14}B$ is a ternary compound with a complicated structure, $Nd_2Fe_{14}B$ crystals can grow without requiring long-range atomic diffusion. The crystallization temperature of $Nd_2Fe_{14}B$ is higher by about 20 to about 90° C. than the temperature at which the crystallization of $Fe_3B$ is completed, i.e., in the range from about 610° C. to about 690° C.

As can be understood, $Fe_3B$ and $Nd_2Fe_{14}B$ crystals grow in mutually different temperature ranges within the inventive material alloy. Thus, a metallic microstructure with a grain size of about 20 nm can be created with good reproducibility without generating an excessively large quantity of heat of reaction due to the crystallization in a short period of time. This is a key point in controlling the heat treatment for the purpose of crystallizing the alloy. This is because if the crystallization progresses too fast, or virtually all at once, due to the generation of an excessively large quantity of heat, then it is no longer possible to control the temperature of the alloy within a prescribed range.

It is not clear so far exactly what type of structure the metastable phase Z included in the alloy actually has. However, since that metastable phase Z corresponds to a particular sharp peak observable by X-ray diffraction analysis, the existence can be recognized quantitatively. The metastable phase Z is usually represented by a sharpest Bragg diffraction peak corresponding to a lattice spacing d of 0.179 nm±0.005 nm, and may sometimes be represented by other diffraction peaks with almost the same intensity, which correspond to the lattice spacings of 0.417 nm±0.005 nm, 0.267 nm±0.005 nm and 0.134 nm±0.005 nm, respectively.

Among these peaks, the ones corresponding to the lattice spacings d of 0.179 nm±0.005 nm and 0.267 nm±0.005 nm may be associated with (006) and (400) planes of $Fe_{23}B_6$ crystals. That is to say, the phase "Z" may represent not only a single metastable phase, but also a multiplicity of metastable phases.

It is believed, in many cases, that the metastable phase Z, which exists in the alloy just after the alloy has been rapidly cooled and solidified, is thermally decomposed as a result of the heat treatment to make a magnet of the alloy, and ultimately creates $Fe_3B$ crystals with a metastable phase. This process would probably take place at various temperatures that are lower than the temperature at which heterogeneous nuclei of $Fe_3B$ crystals are generated most often and distributed within a relatively broad range. In some cases, part of the phase Z may remain in the final product without affecting magnet properties of the material.

The metastable phase Z exists in the vicinity of the surface of the thin-strip solidified alloy when the rapid quenching rate is relatively low, but is non-existent when the rapid quenching rate is relatively high as in the conventional rapid quenching process. According to the present invention, the cooling rate is adjusted to such a range that an appropriate volume fraction of the alloy includes the metastable phase Z. In other words, the volume fraction of the metastable phase Z is one of the parameters for determining an appropriate cooling rate according to the present invention. Thus, even if the composition of the alloy or the quenching apparatus has been changed, an optimum material alloy can be obtained according to the present invention only by adjusting the cooling rate based on the volume fraction of the existent metastable phase. It is not clear whether or not the metastable phase Z itself plays a key role in creating the nanometer-scaled crystals. But it is at least known that excellent magnetic properties are attainable as a result of a subsequent heat treatment if the rapid quenching is carried out under the conditions controlled to make the metastable phase Z existent at a particular volume fraction.

Hereinafter, it will be described what would happen if the cooling rate is out of the specified range.

First, suppose the cooling rate is too fast. Then, the quenched alloy will be almost completely amorphous. Also, since the heterogeneous nuclei of $Fe_3B$ crystals are created in a very small number of sites, $Fe_3B$ crystal grains will overgrow, and therefore a nanocrystalline structure cannot be formed as a result of the subsequent heat treatment. Thus, a magnet made of such an alloy shows decreased coercivity and cannot exhibit excellent magnetic properties.

When the cooling rate is too high, the volume fraction of the metastable phases Z is appreciably low. Specifically, if the volume fraction is estimated as the intensity of a Bragg reflection peak observable by X-ray diffraction analysis, then the intensity of the Bragg reflection peak associated with the metastable phase Z is almost non-observable, i.e., less than 5% of the maximum intensity of the halo pattern. In such a situation, considerable driving force is needed to generate nuclei of $Fe_3B$ crystals. That is to say, the crystallization temperature should be raised. In addition, once the crystallization has started, the crystallization reaction progresses explosively and therefore a large quantity of heat is generated in just a short period of time to increase the temperature of the material alloy by leaps and bounds. As a result, the temperature of the material alloy finally becomes so high that the atoms diffuse at very high rates. Consequently, the reaction is no longer controllable, and nothing but an overgrown metallic structure is obtained at last.

If the crystallization heat treatment is performed using a continuous furnace, then the amount of material alloy powder supplied per unit time should be reduced such that the heat of crystallization reaction is not diffused to the surrounding portions. Even if the alloy is crystallized by a batch process instead of using the continuous furnace, the amount of material alloy powder supplied should be greatly limited because of similar reasons.

Next, suppose the cooling rate is too low. In such a situation, a periodic order is exhibited over a long range. Then, Fe crystals with a stable phase unintentionally grow in many cases. That is to say, if the cooling rate is too slow, then a plurality of Bragg reflection peaks corresponding to crystalline phases are found overlapping with the halo pattern. The cooling rate may be regarded as "too low" when a (110) Bragg reflection peak, which is the intensest diffracted beam of a body-centered Fe crystal, is observed at a diffraction angle corresponding to a lattice spacing of 0.203 nm and the intensity of the peak is equal to or larger than 5% of the maximum intensity of the halo pattern. The Fe crystal might be γ-Fe appearing only at an elevated temperature when it is formed, but the Fe crystal structure changes into body-centered iron at room temperature.

Finally, suppose the cooling rate is not so slow that the nuclei of Fe crystals are generated but is still lower than a preferred rate. In such a situation, embryos of crystal nuclei have already overgrown, and it is impossible to form a nanocrystalline structure even if these structures are heat-treated after that. Also, the volume fraction of the metastable phases Z to the total resultant alloy is very high in such a case. Specifically, according to powder X-ray diffraction analysis, the intensity of a Bragg reflection peak corresponding to the metastable phase Z is outstandingly high, which exceeds 200% of the maximum intensity of the halo pattern.

Even if such a material alloy with a very high volume fraction of metastable phase Z is used, nothing but overgrown metallic structures can be formed by the subsequent heat treatment. This is because the $Fe_3B$ crystal nuclei are generated in a reduced number of sites, and the growth of Fe crystal grains including an equilibrium phase is prevailing. When the metallic structure resulting from the heat treatment is an overgrown one, insufficient magnetic coupling takes place due to the exchange interaction between the magnetization directions of $Fe_3B$ and Fe and that of $Nd_2Fe_{14}B$. As a result, excellent magnetic properties, which are usually expected from a nanocomposite magnet, cannot be attained.

Following is summarized features of the material alloy for nanocomposite magnet according to the present invention:

1) $Fe_3B$ starts to crystallize in the melt-spun alloy at a relatively low temperature because the $Fe_3B$ crystallization proceeds through atomic diffusion over a very short range. Thus, the rate of crystallization reaction cannot be too fast;
2) $Fe_3B$ crystal nuclei are dispersed in the melt-spun alloy at a high density and yet thermal equilibrium phases do not grow excessively. Accordingly, a nanocrystalline metallic structure can be formed;
3) $Fe_3B$ crystals can grow with good controllability and without generating a large quantity of heat during the crystallization reaction. Thus, the amount of material alloy powder processable by the heat treatment can be increased without deteriorating the resultant magnetic properties; and
4) $Fe_3B$ crystal nuclei are dispersed in the melt-spun alloy at a high density and therefore a highly homogeneous nanocrystalline metallic structure can be formed as a result of the heat treatment to produce a magnet. Thus, excellent magnet performance is attainable as well.

To maintain the cooling rate within the preferable range from $5 \times 10^4$ K/s to $5 \times 10^6$ K/s, it is necessary to solidify part of the molten alloy rapidly enough by lowering the temperature of the molten alloy quickly through just a short-time contact of the alloy with the circumference of the rotating chill roller. In addition, it is also necessary to detach a thin-strip alloy, which has been formed by the rapid solidification, from the melt instantaneously, thereby preventing heat of the melt from entering the thin-strip alloy and lowering the temperature of the strip as well. As a result, it is also possible to prevent an unwanted phase transition from occurring in the crystals once formed or the crystal structure from being relaxed excessively. It is noted that the crystal structure should be relaxed moderately to make the metastable phase Z existent.

To carry out such rapid solidification steadily as an industrially efficient process, a constant amount of melt per unit time needs to be fed to the rotating chill roller. For that purpose, a reservoir of the melt is preferably formed in a stabilized position between the source of the melt and the surface of the roller. Such a reservoir can be formed if the melt is propelled against the roller in an appropriate direction with a pressure within a predetermined range applied thereto through a nozzle orifice that has been heated to the melting point of the alloy or more. In the following description, this technique will be referred to as a "first rapid solidification method" for convenience sake. The reservoir of the melt formed this way is kept in its desired shape due to the surface tension of the melt and is usually called a "puddle" or "foot".

The melt reservoir may be formed by various other techniques. For example, according to a method, a refractory is placed near the circumference of a rotating chill roller, thereby providing an upwardly open space between the refractory and the surface of the roller (i.e., the space is opened in the direction in which the roller surface is running). A puddle is formed by injecting the melt into this space. Then, the melt injected comes into contact with the circumference of the roller so as to be rapidly solidified over the circumference of the rotating roller. And the resultant solidified alloy is moved upward along with the surface of the roller and then pulled up from the puddle. In the following description, this technique will be referred to as a "second rapid solidification method" for convenience sake.

A third exemplary rapid solidification method will be briefly described. According to this method, a pair of rollers is disposed such that the circumferences thereof face each other, thereby forming a narrow gap therebetween. And a refractory wall is placed to sandwich the gap therebetween along the sides of the rollers. As a result, an upwardly open space is also formed. The melt is poured constantly into this open space to come into contact with the respective surfaces of the pair of rotating rollers and thereby be rapidly quenched and solidified thereon. In this case, the rollers are rotated in such a direction that the surfaces of the rollers move downward in the space, thereby ejecting the rapidly solidified alloy downward through the gap. According to the third rapid solidification method, several additional pairs of rotating chill rollers may be further provided under the pair of chill rollers to lower the temperature of the alloy through multiple stages.

There is also a technique (which will be referred to as a "fourth rapid solidification method") not requiring the formation of the melt reservoir unlike the first through third rapid solidification techniques. In the fourth method, a spray of the melt is propelled against a rotating chill roller, thereby rapidly solidifying the melt. According to this method, however, the rapid quenching rate is greatly variable with the volume and velocity of the melt droplets propelled against the surface of the roller. Specifically, the maximum volume or velocity of the droplets is several to several tens times as high as the minimum one, and therefore the resulting rapid quenching rate is also distributed within a much broader range compared to the first through third rapid solidification methods. Thus, when the fourth method is adopted, the operation conditions should be determined experientially.

No matter which of the first through fourth rapid quenching methods is employed, the temperature at the circumference of the roller is preferably kept constant by cooling down the roller itself with water or the like flowing inside the roller.

According to the present invention, the temperature $T_m$ of the molten alloy yet to be rapidly quenched is decreased by 400 to 800° C. In any of the conventional methods using the rotating roller, it is industrially difficult to make the length of the contact region between the melt reservoir and the roller circumference exceed a certain value. That is to say, according to the first method, if the volume of the reservoir exceeds a particular range, then the reservoir cannot be formed stably and the steady state cannot be maintained. The upper limit of this range can be somewhat increased by employing the second method because space is provided for the melt reservoir. However, the longer the contact region between the roller and the melt, the longer the period of time a quantity of heat continuously flows from the melt into the solidified alloy. In view of these points, the contact length is preferably in the range from about 5 mm to about 50 mm, both inclusive, during industrial operations.

The surface velocity of the roller is adjusted to attain a desired cooling rate with the length of the contact region defined within the range specified above. Preferred surface velocity of the roller is about 6 to about 20 m/sec. according to the first rapid quenching method or about 2 to about 8 m/sec. according to the second rapid quenching method. Thus, supposing the alloy is cooled down rapidly from 1200° C. to 800° C. over a contact region with the length of 10 mm using a roller rotating at a surface velocity of 6 m/sec., a cooling rate of $2.4\times10^5$ K/s is attained.

The lowest required surface velocity of the roller is determined depending on a quenching condition and the length of the contact region between the melt and the roller. For example, when the contact length is 5 mm, the quenching condition is lowering the temperature of the melt from 1200° C. to 800° C. (i.e., a temperature range with a breadth of 400 K) at a lowest required cooling rate of $5\times10^4$ K/s. Since the contact time needs to be 8 msec. (=400 K ÷$5\times10^4$ K/s), the lowest required surface velocity of the roller is about 0.63 m/sec. (=5 mm ÷8 msec). The highest possible surface velocity of the roller is determined depending on a contact length of 50 mm and a quenching condition of lowering the temperature of the melt from 1200° C. to 400° C. (i.e., a temperature range with a breadth of 800 K) at a highest possible cooling rate of $5\times10^6$ K/s. The highest possible surface velocity is calculated as 312.5 m/sec. in a similar manner.

If the surface velocity of the roller is too low, then the cooling rate is adversely affected by a variation in rate of the melt supplied. On the other hand, if the surface velocity of the roller is too high, then the melt reservoir is excessively stirred up and it is difficult to maintain the steady-state quenching. In addition, the mechanical strength of the roller should also be increased to resist centrifugal force applied by the high-speed rotation. Thus, the excessively high surface velocity is not preferable, either. Accordingly, to realize the stabilized industrial operations, the surface velocity is preferably about 6 to about 20 m/sec. as for the first quenching method or about 2 to about 8 m/sec. as for the second quenching method as described above.

The thickness of the alloy solidified by the above-described method at the cooling rate from $5\times10^4$ K/s to $5\times10^6$ K/s is ordinarily within the range from about 70 µm to about 300 µm. In a rapid solidification process, the velocity of the solidified alloy moving at the interface is variable with the heat transfer coefficient defined between the melt and the surface of the roller. The velocity of the solidification front of alloy according to the present invention is in the range from about 50 mm/sec. to about 100 mm/sec. Supposing the alloy is cooled down from 1200° C. to 800° C. over a contact region with a length of 10 mm at a surface velocity of 6 m/sec., the contact time is 0.167 msec. Thus, the thickness of the alloy strip is about 80 µm to about 170 µm.

Hereinafter, preferred embodiments of the present invention will be described with reference to the accompanying drawings.

Methods for Preparing Material Alloy and Material Alloy Powder

Figure 1B:
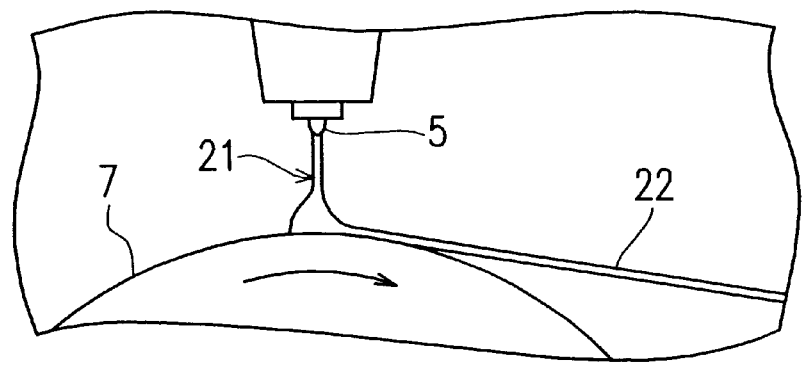
FIG. 1B illustrates, on a larger scale, part of the apparatus where the alloy is rapidly solidified.

According to the present invention, material alloy may be prepared using an apparatus shown in FIGS. 1A and 1B. The alloy preparation process is performed within an inert gas ambient to prevent the material alloy, which contains an easily oxidizable rare-earth element, from being oxidized. The inert gas is preferably a rare gas of helium or argon, for example. Nitrogen gas is not preferred as an inert gas, because nitrogen easily reacts with a rare-earth element.

The apparatus shown in FIG. 1A includes material alloy melting and rapid-quenching chambers 1 and 2, in which vacuum or inert gas ambient is established at an adjustable pressure.

The melting chamber 1 includes: a melt crucible 3; a melt container 4 with a teeming nozzle 5 at the bottom; and an airtight compounded material feeder 8. A material alloy 20, which has been compounded to have a desired magnet alloy composition and supplied from the feeder 8, is melted in the melt crucible 3 at an elevated temperature. A melt 21 of the material alloy 20 is poured into the container 4, which is provided with a heater (not shown) for keeping the temperature of the melt teemed therefrom at a predetermined level.

The rapid-quenching chamber 2 includes: a rotating chill roller 7 for rapidly solidifying the melt 21 propelled against the roller 7 through the teeming nozzle 5; and a crusher 10 for crushing the material alloy that has been rapidly solidified this way. An apparatus of this type can perform melting, teeming, rapid solidification and crushing consecutively and in parallel. For further details, see Japanese Laid-Open Publication No. 8-277403, for example.

In this apparatus, the ambient and the pressure inside the melting and rapid-quenching chambers 1 and 2 are controllable within prescribed ranges. For that purpose, ambient gas inlet ports 1b, 2b, 8b, 9b and outlet ports 1a, 2a, 8a, 9a are provided at appropriate positions of the apparatus.

The melt crucible 3 may be inclined at a desired angle to pour the melt 21 through a funnel 6 into the container 4. The melt 21 is heated within the container 4 by a heater (not shown).

The teeming nozzle 5 of the container 4 is positioned on the boundary wall between the melting chamber 2 and the rapid-quenching chamber 2 to propel the melt 21 in the container 4 against the surface of the chill roller 7, which is located just under the nozzle 5. The orifice diameter of the nozzle 5 may be in the range from about 0.5 to about 2.0 mm, for example. If the viscosity of the melt 21 is high, then the melt 21 cannot flow through the teeming nozzle 5 easily. However, if there exists appropriate pressure difference between the melting and rapid-quenching chambers 1 and 2, then the melt 21 can be teemed smoothly.

The surface of the chill roller 7 may be plated with a chromium layer, for example, and the diameter thereof may be in the range from about 300 mm to about 500 mm, for instance. The water-cooling capability of a water cooler provided inside the chill roller 7 is calculated and adjustable based on the latent heat of solidification and the volume of the water teemed per unit time.

This apparatus can rapidly solidify 20 kg of material alloy in 10 to 40 minutes, for example. The alloy solidified this way is in the form of a thin strip (or ribbon) 22 with a thickness of about 70 to about 150µm and a width of about 1.5 to about 6 mm. Subsequently, the thin-strip alloy 22 gets crushed by the crusher 10 into thin flakes 23 with a length of about 2 to about 150 mm, which are then recovered into a recovery machine 9. In the apparatus illustrated in FIG. 1A, the recovery machine 9 is provided with a presser 11 for pressing the thin flakes 23.

Hereinafter, it will be described how to prepare the material alloy using the apparatus shown in FIG. 1A.

First, the melt 21 of the alloy for nanocomposite magnet, which is represented by a general formula $Fe_{100-x-y}R_xB_y$, $Fe_{100-x-y-z}R_xB_yCo_z$, $Fe_{100-x-y-u}R_xB_yM_u$ or $Fe_{100-x-y-z-u}R_xB_yCo_zM_u$ is prepared and then stored in the container 4 of the melting chamber 1. In this case, the elements R and M and the molar fractions x, y, z and u are selected as described above.

Next, the melt 21 is teemed through the teeming nozzle 5 onto the chill roller 7 to come into contact with, and be rapidly cooled and solidified by, the chill roller 7. According to the present invention, the rapid solidification should be controllable with high precision. In the illustrated embodiment, a single roller method, which is one of liquid rapid quenching methods, is adopted. A gas atomization method is sometimes applicable to solidifying the melt 21 rapidly, but is not preferred according to the present invention. This is because since the cooling rate is greatly variable depending on the powder grain size according to this method, the yield of powder grains that have been quenched at an appropriate cooling rate cannot be sufficiently increased.

In this embodiment, in cooling and solidifying the melt 21, the cooling rate is controlled within the range from $5 \times 10^4$ K/s to $5 \times 10^6$ K/s. The temperature of the alloy is lowered by $\Delta T_1$ at a cooling rate within this range. The temperature of the molten alloy 21 yet to be quenched rapidly is approximately equal to the melting point $T_m$ of the alloy (e.g., in the range from about 1,200° C. to about 1,300° C.). That is to say, the temperature of the alloy decreases from $T_m$ to $(T_m - \Delta T_1)$ on the chill roller 7. According to the results of experiments carried out by the present inventors, $\Delta T_1$ is preferably in the range from about 400° C. to about 800° C. to improve the properties of a final magnet product.

An interval during which the molten alloy 21 is cooled down by the chill roller 7 is equivalent to an interval between a point in time the alloy comes into contact with the circumference of the rotating chill roller 7 and a point in time the alloy detaches itself therefrom. In this embodiment, the interval is in the range from about 0.5 to about 2 milliseconds. In the meantime, the alloy has its temperature decreased by $\Delta T_1$ to solidify. Thereafter, the solidified alloy detaches itself from the roller 7 and travels within the inert gas ambient. While the thin-strip alloy is travelling, the alloy has its heat absorbed by the ambient gas. As a result, the temperature of the alloy further decreases by $\Delta T_2$, and is now $(T_m - \Delta T_1 - \Delta T_2)$. $\Delta T_2$ is variable depending on the size of the apparatus or the pressure of the ambient gas, but typically about 100° C. or more.

According to this embodiment, as soon as the temperature of the thin-strip alloy 22 reaches $(T_m - \Delta T_1 - \Delta T_2)$, the alloy is crushed inside the apparatus to make the thin flakes 23 of the alloy on the spot. Thus, the sum of $\Delta T_1$ and $\Delta T_2$ should preferably be defined at such a value as making $(T_m-\Delta T_1-\Delta T_2)$ lower than the glass transition temperature $T_g$ of the alloy. This is because if $(T_m-\Delta T_1-\Delta T_2) \leq T_g$, then the alloy is too much softened to be crushed satisfactorily. If the solidified alloy is supposed to be crushed and pulverized using another apparatus, then there is no need to consider $(\Delta T_1+\Delta T_2)$, because the temperature of the alloy decreases to around room temperature.

The absolute pressure inside the rapid-quenching chamber 2 is preferably 50 kPa or less, more preferably in the range from 2 to 30 kPa and even more preferably within the range from 3 to 10 kPa. This is because if the melt 21 is injected onto the chill roller 7 at such a reduced chamber pressure, then the ambient gas would not be trapped between the melt 21 and the surface of the roller 7. Accordingly, in such a case, even if the melt 21 is quenched at a lower cooling rate than the conventional one, the alloy can still be cooled uniformly and the resultant thin-strip alloy 22 can show a desired surface shape. In contrast, if the melt 21 is propelled within an atmospheric-pressure ambient against the chill roller 7 rotating at as low a velocity as that defined according to this embodiment, then the surface of the thin-strip alloy 22 might be deformed.

The present inventors found that if the alloy was rapidly solidified by the single roller method within an atmospheric-pressure ambient as in the conventional process, then the ambient gas was easily trapped between the molten alloy and the circumference of the roller. We also found that the properties of the thin-strip (ribbon) alloy rapidly solidified this way partially deteriorated because that portion of the alloy, which had absorbed the ambient gas, had not been cooled down sufficiently. Hereinafter, this phenomenon will be described with reference to the accompanying drawings.

Figure 2A:
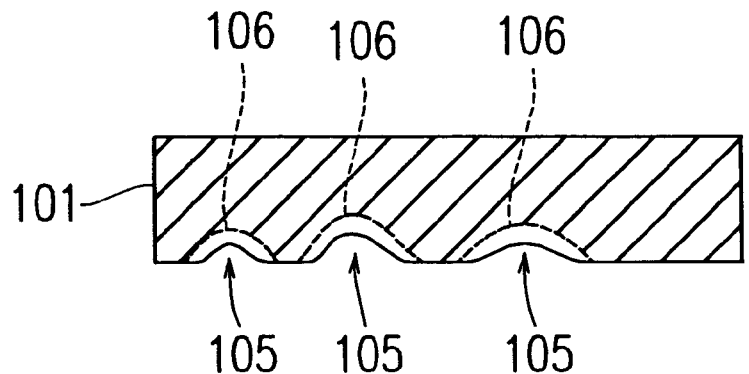
FIGS. 2A and 2B are schematic cross-sectional views of ribbon alloys obtained by rapidly solidifying the alloy with a single roller within an atmospheric-pressure ambient as in the conventional method.
Figure 2B:
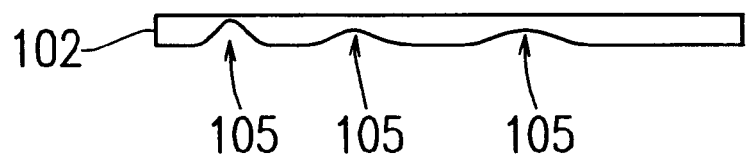

FIGS. 2A and 2B schematically illustrate respective cross sections of ribbon alloys 101 and 102 that are obtained by rapidly solidifying the alloy by the single roller method within the atmospheric-pressure ambient as in the conventional process. Specifically, FIG. 2A illustrates a cross section of the alloy obtained when the surface velocity of the roller is relatively low (e.g., less than 10 m/sec.), while FIG. 2B illustrates a cross section of the alloy obtained when the surface velocity of the roller is relatively high (e.g., 10 m/sec. or more). As can be seen from FIGS. 2A and 2B, if the surface velocity of the roller is low, then the resultant ribbon alloy 101 is relatively thick. Alternatively, if the surface velocity is high, then the resultant ribbon alloy 102 is relatively thin. In both of the examples shown in FIGS. 2A and 2B, a number of dimples 105 are formed in the lower surface of the ribbon alloy 101 or 102 that has been contact with the chill roller 7. These dimples 105 are formed because the ambient gas was trapped between the molten alloy and the surface of the roller. The dimples 105 of the ribbon alloys 101 and 102 have been cooled down only insufficiently by the chill roller 7. That is to say, the cooling rate at the dimples 105 is locally lower than the other portions. In the dimples 105 of the ribbon alloy 101 shown in FIG. 2A, in particular, the local cooling rate falls out of the desired range to form α-Fe phases 106, since the cooling rate is supposed to be relatively low from the beginning. Even after the alloy has been heat-treated, these α-Fe phases 106 will never disappear, thus deteriorating the properties of the $Fe_3B/Nd_2Fe_{14}B$ nanocomposite magnet. In contrast, the ribbon alloy 102 shown in FIG. 2B has been cooled down rapidly as a whole by the roller rotating at a high surface velocity. Accordingly, almost no α-Fe phases have been formed in the dimples 105 of the ribbon alloy 102. Instead, he "metastable phases"(to be described later) are believed to have been formed near the dimples 105.

Figure 2C:
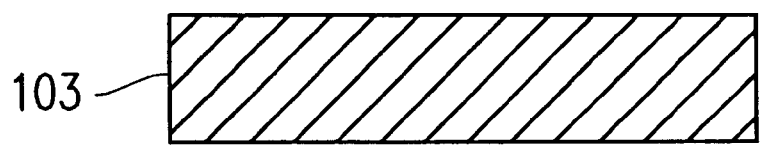
FIGS. 2C and 2D are schematic cross-sectional views of inventive ribbon alloys, which correspond to the counterparts shown in FIGS. 2A and 2B but are obtained by rapidly solidifying the alloy within a low-pressure ambient.
Figure 2D:
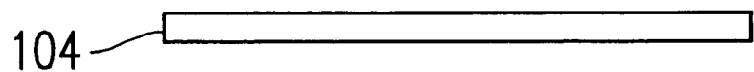

FIGS. 2C and 2D correspond to FIGS. 2A and 2B as for the roller surface velocities defined (i.e., the surface velocity is relatively low in the example shown in FIG. 2C but relatively high in the example shown in FIG. 2D). In the examples shown in FIGS. 2C and 2D, however, ribbon alloys 103 and 104 are formed by rapidly solidifying the alloy in a low-pressure ambient. In both of the examples shown in FIGS. 2C and 2D, no dimples are formed in the lower surface of the ribbon alloy 103 or 104 that has been in contact with the chill roller 7. This is because almost no ambient gas has been trapped between the molten alloy and the circumference of the roller and the molten alloy was in uniform contact with the surface of the roller. Accordingly, even if the surface velocity of the roller is set low so that the cooling rate decreases, the surface of the ribbon alloy 103 is not deformed and almost no α-Fe phases 106 are formed as shown in FIG. 2C. In the example shown in FIG. 2D on the other hand, although the resultant alloy has a planarized lower surface, almost no "metastable phases" have been formed because the cooling rate itself is high.

As can be seen, to suppress trapping of the ambient gas between the molten alloy and the chill roller, the absolute pressure inside the rapid-quenching chamber is preferably 50 kPa or less, more preferably 30 kPa or less. The lower limit of the preferable absolute pressure range is about 1 kPa, because it is no use setting the pressure lower than this value for the purpose of preventing the ambient gas from being trapped.

According to this embodiment, the step of getting the rapidly solidified alloy crushed by the crusher is performed back to back with the rapid solidification step. In such a case, the rapidly cooled alloy, which is ejected out of the chill roller as a long ribbon alloy, can be recovered within a relatively narrow space and is not bulky for storage. If the crusher is provided separately from the rapid-quenching machine, however, the rapidly-quenched alloy should be once stored as a bulky long thin strip.

The alloy is crushed by the crusher into thin flakes, which are then pulverized into powder using a known mechanical grinder such as a mill. In this manner, alloy powder of a size suitable for heat treatment and subsequent molding processes can be prepared. In the illustrated embodiment, the alloy is roughly ground to a grain size of about 850 µm or less using a power mill and then finely ground to a grain size of about 150 µm or less using a pin disk mill. The final milling may be performed after an appropriate crystallization heat treatment (described below).

Method for Preparing Nanocomposite Magnet Powder

Hereinafter, it will be described with reference to FIG. 3 how to conduct a crystallization heat treatment on the material alloy powder prepared in the above-exemplified way.

Figure 3:
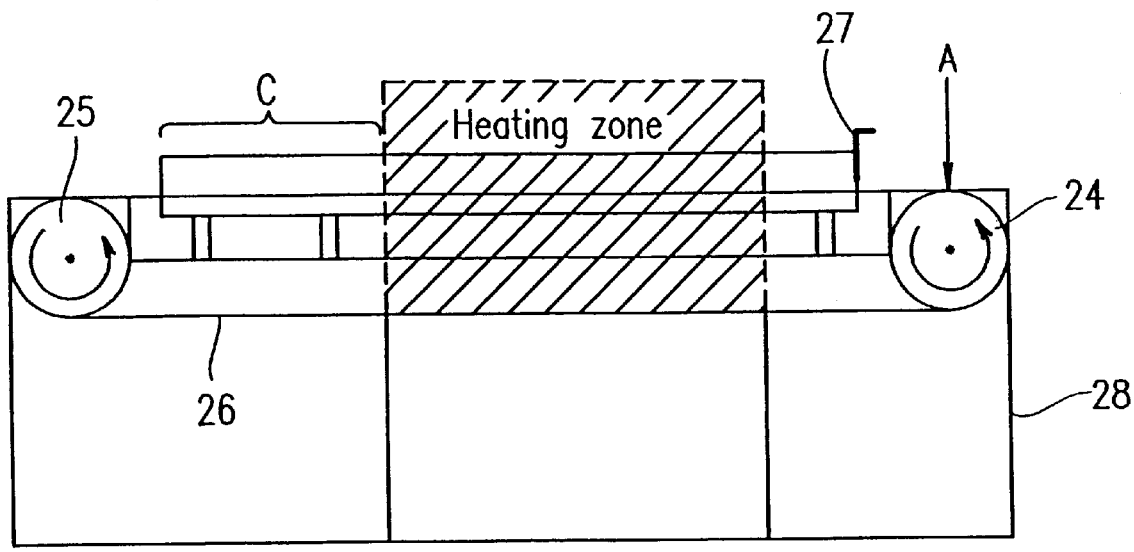
FIG. 3 is a cross-sectional view illustrating an exemplary heat treatment apparatus applicable to the inventive method for producing a nanocomposite magnet, in which alloy powders are carried on a metallic hoop belt in a direction from right to left through a heating zone.

FIG. 3 illustrates a continuous furnace apparatus with a hoop belt. This apparatus includes: a pair of rotating rollers 24 and 25 supported in a freely rotatable position by a body 28; and a hoop belt 26 driven at a predetermined speed in a direction as the rollers 24 and 25 rotate. The material alloy powder is fed at a feeding position A on the hoop belt 26 and then transported leftward in FIG. 3. The powder fed onto the hoop belt 26 has its height uniformized by a sliding cutter 27. As a result, the height of the powder is adjusted not to exceed a certain value (e.g., 2 to 4 mm). Thereafter, the powder enters a heating zone surrounded by a metal tube and heat-treated under a flow of an inert gas ambient for creating nanometer-scaled crystals. The heating zone (with a length of 1,100 mm, for example) is sub-divided into three areas, which are provided with respective heaters (not shown). That is to say, each of these areas has a length of about 300 mm, for example. After the powder has been heated while passing through these heating areas, the powder enters a cooling zone C with a length of 800 mm, for example. In this zone, the powder is cooled by being passed through a water-cooled metal cylinder. The powder cooled in this manner is recovered into a recovery machine (not shown) below and on the left-hand side of the rotating roller 25.

According to this heat treatment apparatus, the heat treatment process is controllable by adjusting the velocity of the moving hoop belt 26 with respect to the given length of the heating zone.

The heat treatment process may be performed by heating the powder up to 590 to 700° C. at a temperature rise rate of 100 to 150° C./min. for about 5 to about 15 minutes. Then, the alloy powder is cooled down to around room temperature at a temperature fall rate of 100 to 150° C./min.

To increase the amount of the powder processable by the heat treatment per unit time, the hoop belt 26 may be widened such that the amount of the powder transported increases per unit length of the belt 26, the length of the heating zone may be increased and/or the velocity of the rotating rollers 24 and 25 may be increased. Since the alloy powder according to the present invention does not generate a large quantity of heat instantaneously during the crystallization reaction through the heat treatment, the temperature of the alloy powder is easily controllable during the heat treatment process. Accordingly, even if the amount of the powder supplied is increased, the resultant magnet powder still exhibits stabilized magnetic properties.

The material powder that has been heat-treated using this apparatus changes into nanometer-scaled crystallites as described above, and the resultant powder exhibits properties specific to a nanocomposite magnet. In this manner, the material alloy powder, which was a metallic glass exhibiting no hard magnetic properties before the heat treatment, changes into the nanocomposite magnet powder exhibiting excellent magnetic properties as a result of the heat treatment.

Method for Producing Magnet

Hereinafter, a method for producing a nanocomposite magnet out of the material alloy powder will be described.

First, a binder of an epoxy resin and additives are added to the row material alloy powder, i.e., the nanocomposite magnet powder, and then kneaded to form a compound. The kneading process may involve a process for drying solvent used to dilute the epoxy resin. Next, the compound is molded using a molding machine with a cavity corresponding to the desired shape of the compound. Subsequently, the resultant molded compound is cured, cleaned, coated, tested and then magnetized to obtain a final bonded magnet product.

The molding process does not have to be the compression process. Alternatively, the process may be performed by known extrusion molding, injection molding or calender rolling. The magnet powder is kneaded with synthetic resin, rubber or the like, which is selected depending on the type of the molding process adopted. In employing injection molding, not only polyimide (nylon) widely used as a resin, but also a high-softening-point resin such as PPS (polyphenylene sulfide) may be used. This is because the magnet powder according to the present invention is made of an alloy containing a small fraction of rare-earth elements, and therefore is less likely to be oxidized. Accordingly, even when the magnet powder is molded by the injection process at a relatively high temperature, the magnetic properties thereof do not deteriorate.

In addition, since the magnet according to the present invention is less likely to be oxidized, there is no need to coat the surface of a final magnet product with a resin film. Thus, it is possible to produce a component including a magnet of a complicated shape by injecting the magnet powder according to the present invention, along with a molten resin, into a slot of the complicated shape in the component.

Motor

Next, an exemplary embodiment of a motor including magnets produced in this manner will be described with reference to FIG. 9.

The motor according to this embodiment is an interior permanent magnet (IPM) type motor including a plurality of bonded magnets produced by the inventive producing method for a built-in rotor.

Figure 9:
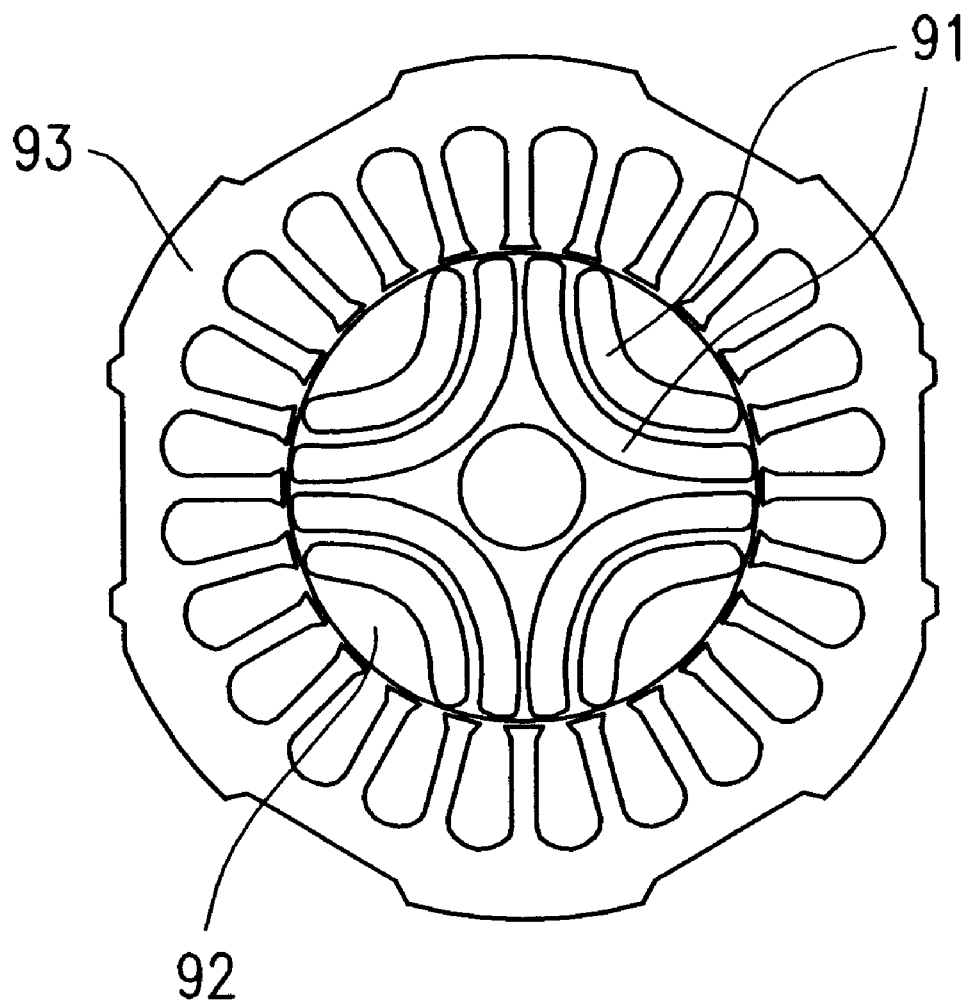
FIG. 9 is a cross-sectional view illustrating a motor according to the present invention.

FIG. 9 illustrates a cross section of a motor according to this embodiment. As shown in FIG. 9, the motor includes a rotor core 92, which the nanocomposite permanent magnets 91 are built in, and a stator 93 surrounding the rotor core 92. A number of slots are formed in the rotor core 92 and the magnets 91 are located within these slots. The magnets 91 are formed by melting the inventive nanocomposite magnet powder compound, directly filling in the slots of the rotor core 92 with the molten compound, and then molding the compound. The rotor core 92 shown in FIG. 9 has a four-pole two-layer configuration. Alternatively, the rotor core 92 may have any other configuration, e.g., eight-pole two-layer or eight-pole one-layer configuration.

The magnet according to the present invention is suitably applicable to motors of various other types and actuators.

Hereinafter, specific examples of the present invention and comparative examples thereof will be described.

EXAMPLE 1

In this example, the rapid solidification process was performed within argon ambient at an absolute pressure of 30 kPa or less. A copper alloy roller (with a diameter of 350 mm) plated with a chromium layer with a thickness of 5 to 15 $\mu$m was used as a chill roller. A melt of the material alloy was propelled against the circumference of the copper alloy roller rotating at a surface velocity of 10 m/sec., thereby rapidly quenching the melt. The temperature of the melt measured 1,300° C. by a radiation thermometer. The melt was propelled through an orifice at a rate of 10 to 20 g per second to have a diameter of 1.3 to 1.5 mm.

The following Table 1 shows respective compositions of various melt specimens and associated ratios of the intensity of a Bragg reflection peak corresponding to the metastable phase Z with respect to the maximum intensity of the halo pattern.

TABLE 1

| No. | Fe | B | R | M | Co | X-ray diffraction intensity ratio (%) |
|---|---|---|---|---|---|---|
| 1 | 79.5 | 17 | Nd3 | Si1 | | 150 |
| 2 | 74.3 | 18.5 | Nd3.5 | Cr0.7 | 3 | 120 |
| 3 | 74 | 20 | Nd2.5 + Pr1 | Cu0.5 + Nb1 | 1 | 120 |
| 4 | 75.5 | 18.5 | Nd4 | Cr2 | 0 | 70 |
| 5 | 74 | 18 | Nd2 + Pr2 | Ga1 | 3 | 60 |
| 6 | 72 | 17.5 | Nd4.5 | Ag0.5 + Cu1 | 4.5 | 40 |
| 7 | 76 | 20 | Nd2.5 + Pr1 | Zr0.5 | 2 | 130 |
| 8 | 66 | 18.5 | Nd5.5 | Cr5 | 5 | 10 |
| 9 | 71.5 | 18.5 | Nd5 | V5 | 0 | 20 |
| 10 | 76.5 | 18 | Pr2 + Th1 | Al0.5 | 2 | 130 |
| 11 | 74.4 | 18.5 | Nd3 + Dy1 | Mo0.1 | 3 | 100 |
| 12 | 71.4 | 19 | Pr3 + Ho0.5 | Hf0.1 | 6 | 110 |
| 13 | 77.5 | 18 | Pr3 + Sm0.5 | Ta1 | 2 | 110 |
| 14 | 74.5 | 17 | Nd4 | Au0.5 + Pt1 | 3 | 80 |
| 15 | 78 | 18 | Nd4 | None | 0 | 120 |

As shown in Table 1, the intensity ratios of all the specimens were within the range from 5 to 200%. In Table 1, the description "Nd2.5+Pr1" for R, for example, means that the melt specimen contains Nd and Pr as rare-earth elements and that the molar fractions thereof are 2.5 and 1 atomic percents, respectively.

Figure 4A:
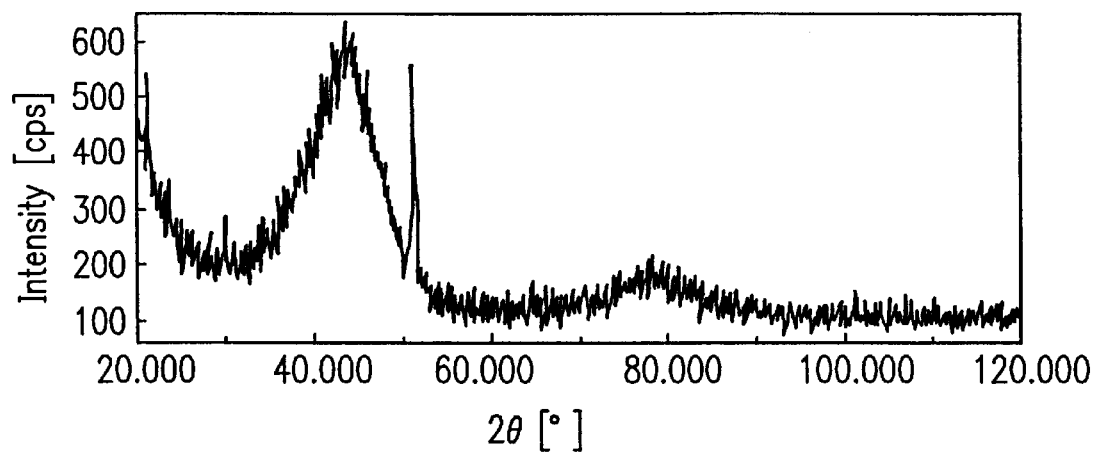
FIG. 4A is a graph illustrating an X-ray diffraction pattern according to a first example of the present invention.

FIG. 4A illustrates a pattern obtained for Specimen 2 in Table 1 by powder X-ray diffraction analysis. As shown in FIG. 4A, the background halo pattern reaches its maximum intensity when 2θ=about 43 degrees, while a sharpest intensity peak is observed when 2θ=about 51.4 degrees. This sharpest intensity peak is a Bragg reflection peak, which corresponds to a lattice spacing of 0.179 nm±0.005 nm and results from the existence of the metastable phase Z. In FIG. 4A, diffracted beams represented by the metastable phase Z are also observable at respective peaks corresponding to lattice spacings of 0.417 nm±0.005 nm and 0.267 nm±0.005 nm.

The powder X-ray diffraction patterns were observed using Rigaku RINT 2000 as a diffractometer and placing a monochromator between the specimens and a Cu target. Another monocrhometer was placed between the specimens and a counter (detector) in order to cut off inelastically scattered X-rays caused by iron atoms.

The material alloy of this example was ground into powder with a grain size of 850 μm or less and then the resultant powder was heat-treated in the powder sintering furnace (with a length of 2 m for testing purposes) shown in FIG. 3. The material alloy powder passed through the heating zone in 10 minutes and then the cooling zone C in another 10 minutes. The heat treatment ambient was argon gas and the material alloy powder was fed onto the belt at a density of 0.6 g/cm² (per unit area). The following Table 2 shows the resultant magnetic properties of respective specimens and associated optimum heat treatment temperatures when 3 kg of the powder was processed per unit time.

TABLE 2

| No. | Optimum heat treatment temperature (° C.) | Magnetic properties (flake specimen) | | |
|---|---|---|---|---|
| | | $H_{cJ}$ (kA/m) | $B_r$ (T) | $(BH)_{max}$ (kJ/m³) |
| 1 | 600 | 286 | 1.26 | 124 |
| 2 | 595 | 288 | 1.14 | 126 |
| 3 | 650 | 228 | 1.22 | 122 |
| 4 | 610 | 322 | 1.16 | 102 |
| 5 | 640 | 346 | 1.18 | 133 |
| 6 | 650 | 310 | 1.15 | 128 |
| 7 | 660 | 276 | 0.93 | 96 |
| 8 | 620 | 526 | 0.86 | 86 |
| 9 | 625 | 410 | 0.85 | 79 |
| 10 | 640 | 376 | 1.08 | 112 |
| 11 | 680 | 358 | 1.08 | 119 |
| 12 | 675 | 333 | 0.96 | 102 |
| 13 | 690 | 250 | 1.12 | 98 |
| 14 | 595 | 344 | 1.12 | 130 |
| 15 | 605 | 240 | 1.28 | 108 |

Comparative Example 1

A similar process was performed as in the first example using melt specimens with respective compositions shown in the following Table 3.

TABLE 3

| No. | Fe | B | R | M | Co | X-ray diffraction intensity ratio (%) |
|---|---|---|---|---|---|---|
| 16 | 79.5 | 17 | Nd3 | Si1 | | 4 |
| 17 | 74.3 | 18.5 | Nd3.5 | Cr0.7 | 3 | 3 |
| 18 | 74 | 20 | Nd2.5 + Pr1 | Cu0.5 + Nb1 | 1 | 4 |
| 19 | 75.5 | 18.5 | Nd4 | Cr2 | 0 | <2 |
| 20 | 74 | 18 | Nd2 + Pr2 | Ga1 | 3 | <2 |
| 21 | 72 | 17.5 | Nd4.5 | Ag0.5 + Cu1 | 4.5 | <2 |
| 22 | 76 | 20 | Nd2.5 + Pr1 | Zr0.5 | 2 | 4 |
| 23 | 66 | 18.5 | Nd5.5 | Cr5 | 5 | <2 |
| 24 | 71.5 | 18.5 | Nd5 | V5 | 0 | <2 |
| 25 | 76.5 | 18 | Pr2 + Th1 | Al0.5 | 2 | <2 |
| 26 | 74.4 | 18.5 | Nd3 + Dy1 | Mo0.1 | 3 | <2 |
| 27 | 71.4 | 19 | Pr3 + Ho0.5 | Hf0.1 | 6 | 3 |
| 28 | 77.5 | 18 | Pr3 + Sm0.5 | Ta1 | 2 | 4 |
| 29 | 74.5 | 17 | Nd4 | Au0.5 + Pt1 | 3 | <2 |
| 30 | 78 | 18 | Nd4 | None | 0 | 4 |

Rapid solidification conditions according to this comparative example are substantially the same as those of the first example except that the melt was quenched by a roller rotating at a surface velocity of 20 m/sec. As can be seen from Table 3, the ratio of the intensity of the Bragg reflection peak represented by the metastable phase Z with respect to the maximum intensity of the halo pattern was less than 5 percent for every specimen.

Figure 4B:
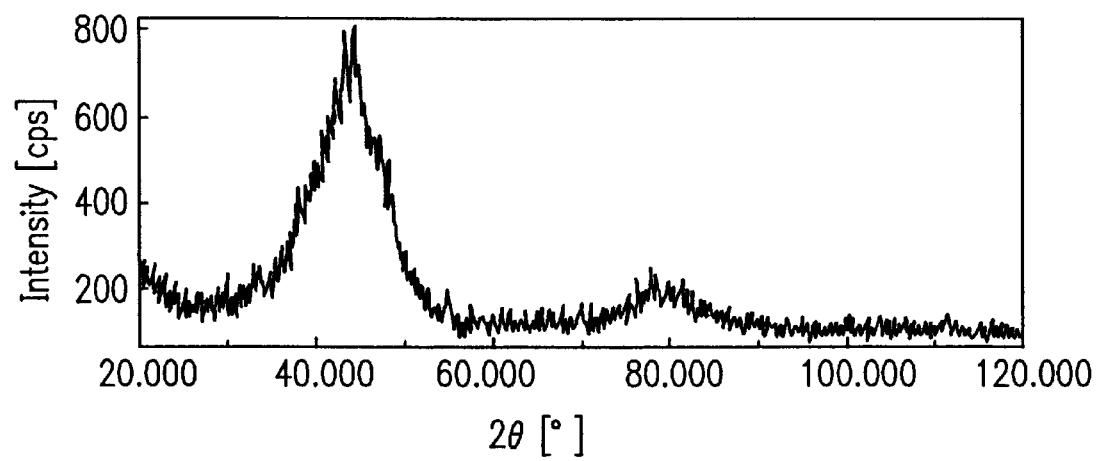
FIG. 4B is a graph illustrating an X-ray diffraction pattern according to a first comparative example.

FIG. 4B illustrates a pattern obtained for Specimen 17 in Table 3 by the powder X-ray diffraction analysis. As shown in FIG. 4B, no Bragg reflection peaks resulting from the metastable phase Z were clearly observable.

The following Table 4 shows the resultant magnetic properties of respective heat-treated specimens and associated optimum heat treatment temperatures according to this comparative example. The same heat treatment apparatus and method as the counterparts of the first example were used.

TABLE 4

| No. | Optimum heat treatment temperature (° C.) | Magnetic properties (flake specimen) | | |
|---|---|---|---|---|
| | | $H_{cJ}$ (kA/m) | $B_r$ (T) | $(BH)_{max}$ (kJ/m³) |
| 16 | 620 | 222 | 1.16 | 92 |
| 17 | 610 | 221 | 0.92 | 89 |
| 18 | 680 | 202 | 1.09 | 98 |
| 19 | 640 | 263 | 1.03 | 92 |
| 20 | 660 | 296 | 1.04 | 103 |
| 21 | 670 | 290 | 0.98 | 98 |
| 22 | 670 | 202 | 0.85 | 76 |
| 23 | 640 | 446 | 0.81 | 68 |
| 24 | 635 | 388 | 0.80 | 67 |
| 25 | 650 | 316 | 0.99 | 92 |
| 26 | 680 | 318 | 1.01 | 101 |
| 27 | 685 | 298 | 0.92 | 82 |
| 28 | 695 | 223 | 1.01 | 78 |
| 29 | 620 | 304 | 1.03 | 104 |
| 30 | 660 | 221 | 1.15 | 94 |

As can be seen from Table 4, the magnetic properties (e.g., coercivities) of the specimens according to the comparative example are inferior to those attained by the first example. This is because the heat treatment cannot be controlled and crystals cannot grow in this comparative example so satisfactorily as in the first example.

To attain magnetic properties comparable to those of the first example, the amount of the powder processed by the heat treatment had to be reduced to 0.7 kg per hour. In this comparative example, since the heat treatment is less controllable, a magnet alloy with a desired metal structure cannot be obtained unless the amount of the alloy powder processed per unit time is reduced. That is to say, this comparative example results in a lower throughput of the heat treatment process and is not suitable for mass production.

Comparative Example 2

A similar process was performed as in the first example using melt specimens with respective compositions shown in the following Table 5.

TABLE 5

| No. | Composition | | | | | Intensity ratio (%) | |
|---|---|---|---|---|---|---|---|
| | Fe | B | R | M | Co | Z (%) | Fe (%) |
| 31 | 79.5 | 17 | Nd3 | Si1 | | 550 | <4 |
| 32 | 74.3 | 18.5 | Nd3.5 | Cr0.7 | 3 | 900 | 250 |
| 33 | 74 | 20 | Nd2.5 + Pr1 | Cu0.5 + Nb1 | 1 | 550 | 8 |
| 34 | 75.5 | 18.5 | Nd4 | Cr2 | 0 | 470 | 6 |
| 35 | 74 | 18 | Nd2 + Pr2 | Ga1 | 3 | 560 | 120 |
| 36 | 72 | 17.5 | Nd4.5 | Ag0.5 + Cu1 | 4.5 | 310 | 10 |
| 37 | 76 | 20 | Nd2.5 + Pr1 | Zr0.5 | 2 | 340 | 15 |
| 38 | 66 | 18.5 | Nd5.5 | Cr5 | 5 | 300 | 20 |
| 39 | 71.5 | 18.5 | Nd5 | V5 | 0 | 290 | 90 |
| 40 | 76.5 | 18 | Pr2 + Tb1 | Al0.5 | 2 | 330 | 20 |
| 41 | 74.4 | 18.5 | Nd3 + Dy1 | Mo0.1 | 3 | 250 | <4 |
| 42 | 71.4 | 19 | Pr3 + Ho0.5 | Hf0.1 | 6 | 320 | 10 |
| 43 | 77.5 | 18 | Pr3 + Sm0.5 | Ta1 | 2 | 340 | 33 |
| 44 | 74.5 | 17 | Nd4 | Au0.5 + Pt1 | 3 | 280 | 130 |
| *45 | 78 | 18 | Nd4 | None | 0 | 230 | 80 |

Rapid solidification conditions according to this comparative example are substantially the same as those of the first example except that a different amount of the melt was propelled at a rate of 20 to 30 g per second against a roller rotating at a surface velocity of 5 m/sec. In this comparative example, 3 kg of the powder was also heat-treated per hour as in the first example.

Table 5 shows not only ratios of the intensity of a Bragg reflection peak represented by the metastable phase Z with respect to the maximum intensity of the halo pattern, but also ratios of the intensity of a (110) Bragg reflection peak of body-centered Fe with respect to the maximum intensity of the halo pattern. As can be seen from Table 5, if the cooling rate is too low, then a ratio of the intensity of a Bragg reflection peak represented by the metastable phase Z with respect to the maximum intensity of the halo pattern always exceeds 200%.

Figure 5:
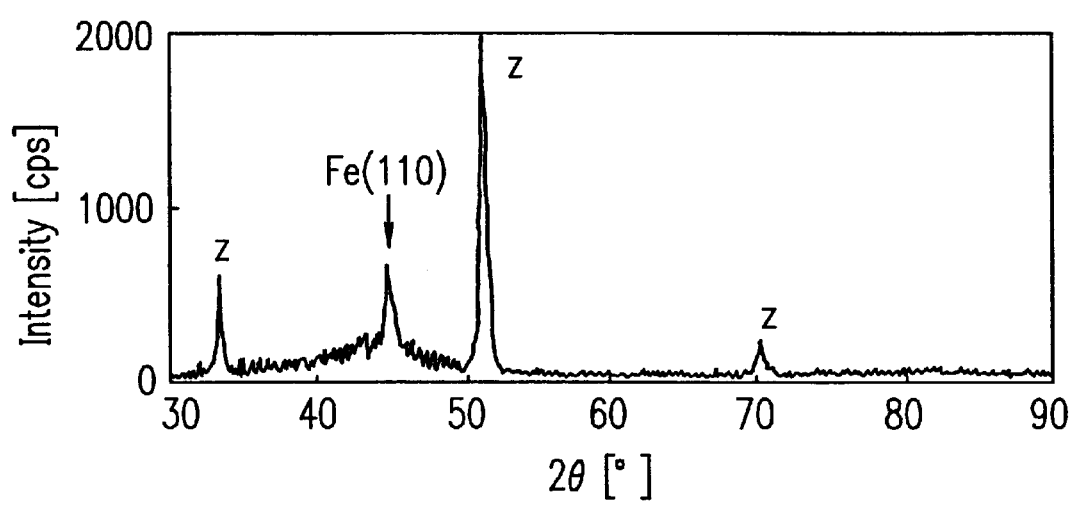
FIG. 5 is a graph illustrating an X-ray diffraction pattern according to a second comparative example.

FIG. 5 illustrates a pattern obtained for Specimen 32 in Table 5 by the powder X-ray diffraction analysis. As shown in FIG. 5, sharp Bragg reflection peaks associated with the metastable phase Z were clearly observable, but the intensity of the halo pattern considerably decreased.

The following Table 6 shows the resultant magnetic properties of respective heat-treated specimens and associated optimum heat treatment temperatures according to this comparative example. The same heat treatment apparatus and method as the counterparts of the first example were used.

TABLE 6

| No. | Optimum heat treatment temperature (° C.) | Magnetic properties (flake specimen) | | |
|---|---|---|---|---|
| | | $H_{cJ}$ (kA/m) | $B_r$ (T) | $(BH)_{max}$ (kJ/m³) |
| 31 | 620 | 202 | 1.07 | 88 |
| 32 | 610 | 195 | 0.90 | 78 |
| 33 | 680 | 199 | 0.99 | 91 |
| 34 | 640 | 203 | 0.71 | 72 |
| 35 | 660 | 246 | 0.92 | 84 |
| 36 | 670 | 280 | 0.96 | 94 |
| 37 | 670 | 189 | 0.75 | 56 |
| 38 | 640 | 402 | 0.78 | 58 |
| 39 | 635 | 378 | 0.77 | 58 |
| 40 | 650 | 278 | 0.91 | 68 |
| 41 | 680 | 228 | 0.89 | 75 |
| 42 | 685 | 228 | 0.90 | 77 |
| 43 | 695 | 201 | 0.92 | 58 |
| 44 | 620 | 248 | 0.84 | 78 |
| 45 | 675 | 198 | 0.98 | 82 |

As can be seen from Table 6, the magnetic properties (e.g., coercivities) of the specimens according to the comparative example are inferior to those attained by the first example.

Even when a different amount of the powder was heat-treated per hour, magnetic properties comparable to those of the first example could not be attained. Thus, it can be seen that a preferable nanocomposite composition cannot be obtained if the cooling rate is too low.

EXAMPLE 2

Hereinafter, a specific example of the second rapid quenching method will be described.

In this example, the nozzle orifice and the rotating roller are placed at respective positions different from those defined for the apparatus shown in FIG. 1. Specifically, the melt was poured from the container 4, which was positioned above the chill roller 7 to incline at an angle of 45 degrees about the center of the roller 7, with a gutter interposed therebetween. And the melt was rapidly cooled such that the melt was 5 to 8 mm deep within an upwardly open space (with a width of 10 mm) surrounded by the gutter and the surface of the roller. In this example, respective specimens of the material alloy used are the same as those shown in Tables 1 and 3.

The thin-strip alloy, which had been solidified by the contact with the surface of the roller, was pulled upward as the roller 7 rotated. And when the alloy passed the top of the roller 7, the alloy was stripped from the roller 7 and dropped downward. Thereafter, the thin-strip alloy was introduced through a slider into a crusher and then crushed therein. In this example, the roller rotated at a surface velocity of 5 m/sec. The temperature of the melt at the puddle was in the range from 1,200 to 1,280° C. The pressure of the ambient during rapid quenching was in the range from 40 kPa to 50 kPa. The temperature of the thin-strip alloy was estimated based on a Stefan-Boltzmann distribution by measuring the intensity of infrared rays in a wavelength band of 3 to 5 μm and introducing certain corrections with respect to emissibility of the molten alloys and absorption due to the observation window. The temperature of the thin-strip alloy estimated in this manner was already as low as about 800 to about 900° C. just after the alloy was pulled out of the puddle. The thickness of the resultant thin-strip alloy was in the range from 100 μm to 170 μm. Supposing the length of the contact region between the melt and the roller was 1.4 times as long as the depth of the melt (1/cos 45 degrees), the rapid quenching rate was estimated to be $1.3 \times 10^6$ K/sec. to $3.4 \times 10^6$ K/sec.

Since the melt was rapidly cooled after having been pulled out of the puddle, the temperature of the thin-strip alloy had decreased to about 400 to 500° C. before the alloy was stripped from the roller 7. In the apparatus used in this example, the diameter of the roller 7 was 350 mm and the interval between a point in time the molten alloy came into contact with the roller and a point in time the solidified alloy was stripped from the roller was equivalent to a time taken for the roller to rotate one-eighth of the circumference, i.e., about 20 msec. Thus, the average cooling rate of the melt on the roller was estimated to be $3.6 \times 10^4$ K/sec. to $4.5 \times 10^4$ K/sec.

A thermoanalysis is conducted at 20° C./min with an amorphous alloy specifically provided by melt-spinning method with a wheel velocity of 20 m/s and some glass transition is observed at a temperature equal to or lower than the crystallization temperature of $Fe_3B$ (about 590 to 600° C.) for some alloys. The glass transition temperature of the alloy is at most about 550 to about 580° C., if any. If no glass transition is observable as a result of the thermoanalysis, then the glass transition temperature is equal to or higher than the crystallization temperature. In this example, the temperature of the thin-strip alloy was 400 to 500° C. when the alloy was stripped from the roller 7. Thus, it can be seen that the thin-strip alloy was stripped from the roller 7 after having been rapidly cooled to the glass transition temperature or less.

Figure 6:
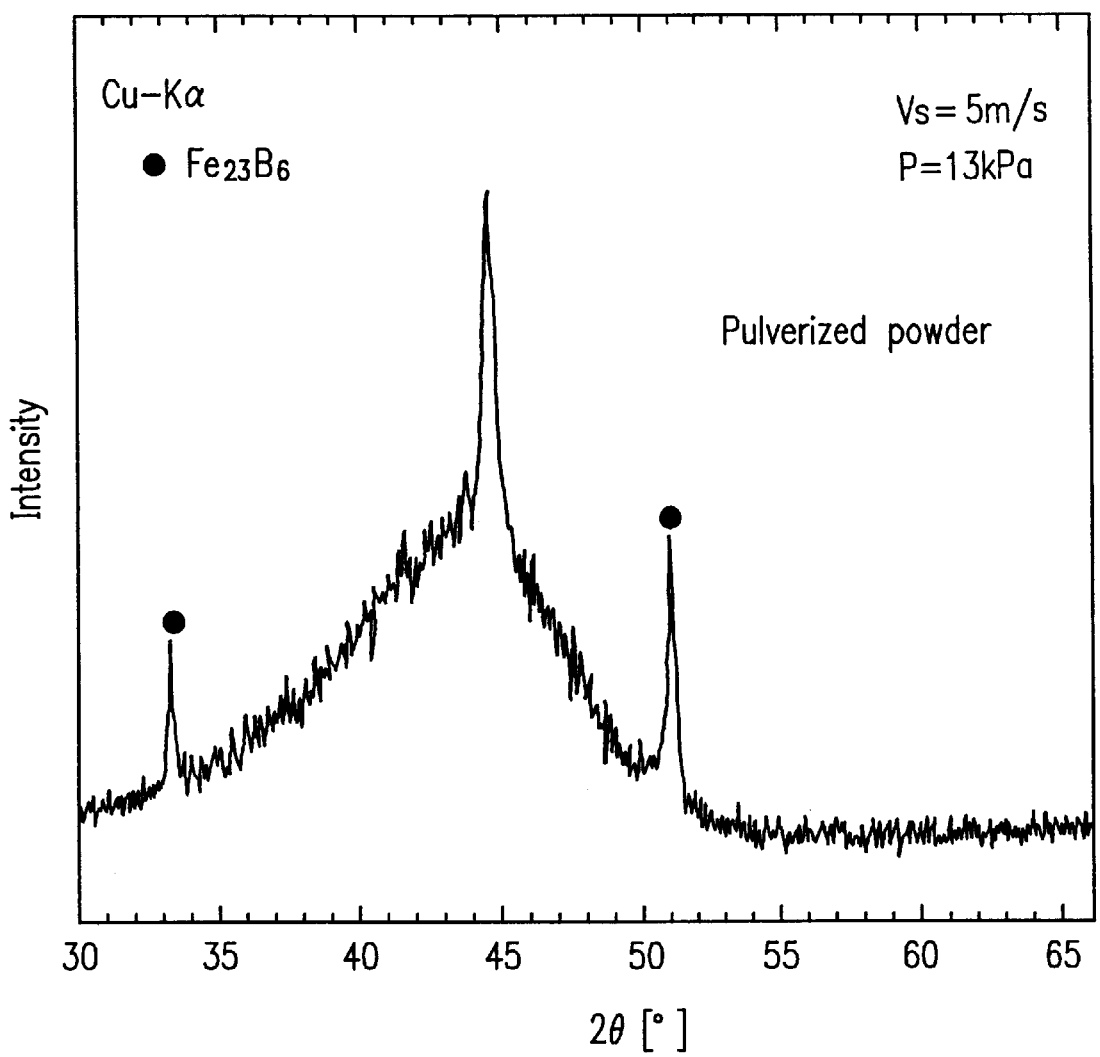
FIG. 6 is a graph illustrating an X-ray diffraction pattern according to a second example of the present invention.

The thin-strip alloy obtained in this manner was analyzed with Cu-K α radiations of an X-ray diffractometer. As a result, a diffraction pattern shown in FIG. 6 was obtained. We found that the diffracted beams included in this diffraction pattern can be indexed as $Fe_{23}B_6$ phases as shown in FIG. 6. The peak of (511) reflection of $Fe_{23}B_6$ and the peak of (110) reflection of α-Fe are observed at substantially the same diffraction angles, but no peak is observed at a diffraction angle corresponding to the (200) reflection of α-Fe, i.e., 2θ=65.2 degrees. Since the volume fraction of α-Fe is less than the limit of detection sensitivity, α-Fe can be regarded as substantially non-existent.

To evaluate the magnetic properties of the material alloy, the alloy was heat-treated using the heat treatment furnace shown in FIG. 3 while feeding 3 kg of the alloy per hour. The alloy exhibited the magnetic properties shown in the following Table 7 at respective optimum heat treatment temperatures (i.e., the set temperatures of the furnace) also shown in Table 7.

TABLE 7

| No. | Optimum heat treatment temperature (° C.) | Magnetic properties (flake specimen) | | |
|---|---|---|---|---|
| | | $H_{cJ}$ (kA/m) | $B_r$ (T) | $(BH)_{max}$ (kJ/m³) |
| 1 | 660 | 280 | 1.24 | 120 |
| 2 | 640 | 282 | 1.11 | 121 |
| 3 | 690 | 230 | 1.23 | 119 |
| 4 | 680 | 330 | 1.15 | 98 |
| 5 | 690 | 340 | 1.16 | 128 |
| 6 | 690 | 310 | 1.12 | 122 |
| 7 | 690 | 272 | 0.96 | 93 |
| 8 | 660 | 528 | 0.84 | 82 |
| 9 | 680 | 402 | 0.86 | 80 |
| 10 | 670 | 368 | 1.08 | 112 |
| 11 | 690 | 356 | i.07 | 110 |
| 12 | 690 | 324 | 0.95 | 112 |
| 13 | 710 | 240 | 1.11 | 95 |
| 14 | 650 | 344 | 1.13 | 124 |
| 15 | 640 | 236 | 1.28 | 105 |

As can be seen from Table 7, the magnetic properties attained by this example are superior to those attained by the first comparative example in which the alloy with the same composition was heat-treated at a feeding rate of 0.7 kg per hour. In other words, the throughput of the heat treatment process according to this example is relatively high. It should be noted that the numbers of specimens on the leftmost column in Table 7 correspond to those shown in Tables 1 and 3, i.e., a material alloy specimen with the same composition is identified by the same number.

EXAMPLE 3

Hereinafter, a specific example of the third rapid quenching method will be described.

A pair of carbon steel chill rollers (with a diameter of 150 mm and a width of 120 mm each) are disposed to face each other with a gap of 160 μm provided therebetween. These rollers were rotated at the same surface velocity (i.e., 5 m/sec.) and in mutually opposite directions such that the alloy on these surfaces of the rollers moved downward through the gap. In this manner, the melt was injected downward through a quartz nozzle orifice toward the gap between the rollers, thereby forming a melt puddle inside the gap space. The depth of the puddle, which had been estimated based on the width thereof was about 10 mm (i.e., about 10 mm in the direction parallel to the width direction of the gap). The solidified alloy was pulled downward out of the gap between the rollers to obtain a continuous rapidly-quenched thin-strip alloy. The temperature of the molten alloy yet to be rapidly quenched was 1,300° C., while the temperature of the thin-strip alloy was about 800° C. just under the rollers. Accordingly, the average cooling rate was estimated to be about $2.5 \times 10^5$ K/sec. In this example, the thin-strip alloy was further cooled down with cooled argon gas flow to have its temperature decreased to 500° C. or less.

To evaluate the magnetic properties of the material alloy, the alloy was heat-treated using the heat treatment furnace shown in FIG. 3 while feeding 3 kg of the alloy per hour. The alloy exhibited the magnetic properties shown in the following Table 8 at respective optimum heat treatment temperatures (i.e., the set temperatures of the furnace) also shown in Table 8.

TABLE 8

| | Optimum heat treatment | Magnetic properties (flake specimen) | | |
|---|---|---|---|---|
| No. | temperature (° C.) | $H_{cJ}$ (kA/m) | $B_r$ (T) | $(BH)_{max}$ (kJ/m³) |
| 1 | 660 | 270 | 1.20 | 110 |
| 2 | 640 | 273 | 1.03 | 101 |
| 3 | 690 | 212 | 1.17 | 111 |
| 4 | 680 | 330 | 1.15 | 98 |
| 5 | 690 | 330 | 1.12 | 118 |
| 15 | 640 | 230 | 1.21 | 98 |

As can be seen from Table 8, the magnetic properties attained by this example are superior to those attained by the first comparative example in which the alloy with the same composition was heat-treated at a feeding rate of 0.7 kg per hour. In other words, the throughput of the heat treatment process according to this example is relatively high.

EXAMPLE 4

In this example, the rapid solidification process was performed within argon ambient with an absolute pressure of 50 kPa or less. A copper alloy roller (with a diameter of 350 mm) plated with a chromium layer with a thickness of 5 to 15 μm was used as a chill roller. A melt of the material alloy was propelled against the circumference of the copper alloy roller rotating at a surface velocity of 10 m/sec., thereby rapidly quenching the melt. The temperature of the melt measured 1,300° C. by a radiation thermometer. The melt was propelled through an orifice at a rate of 10 to 20 g per second to have a diameter of 1.3 to 1.5 mm. In this example, the composition of the alloy was $Nd_{4.5}Fe_{73.2}Cr_{0.8}Co_3B_{18.5}$.

Figure 7:
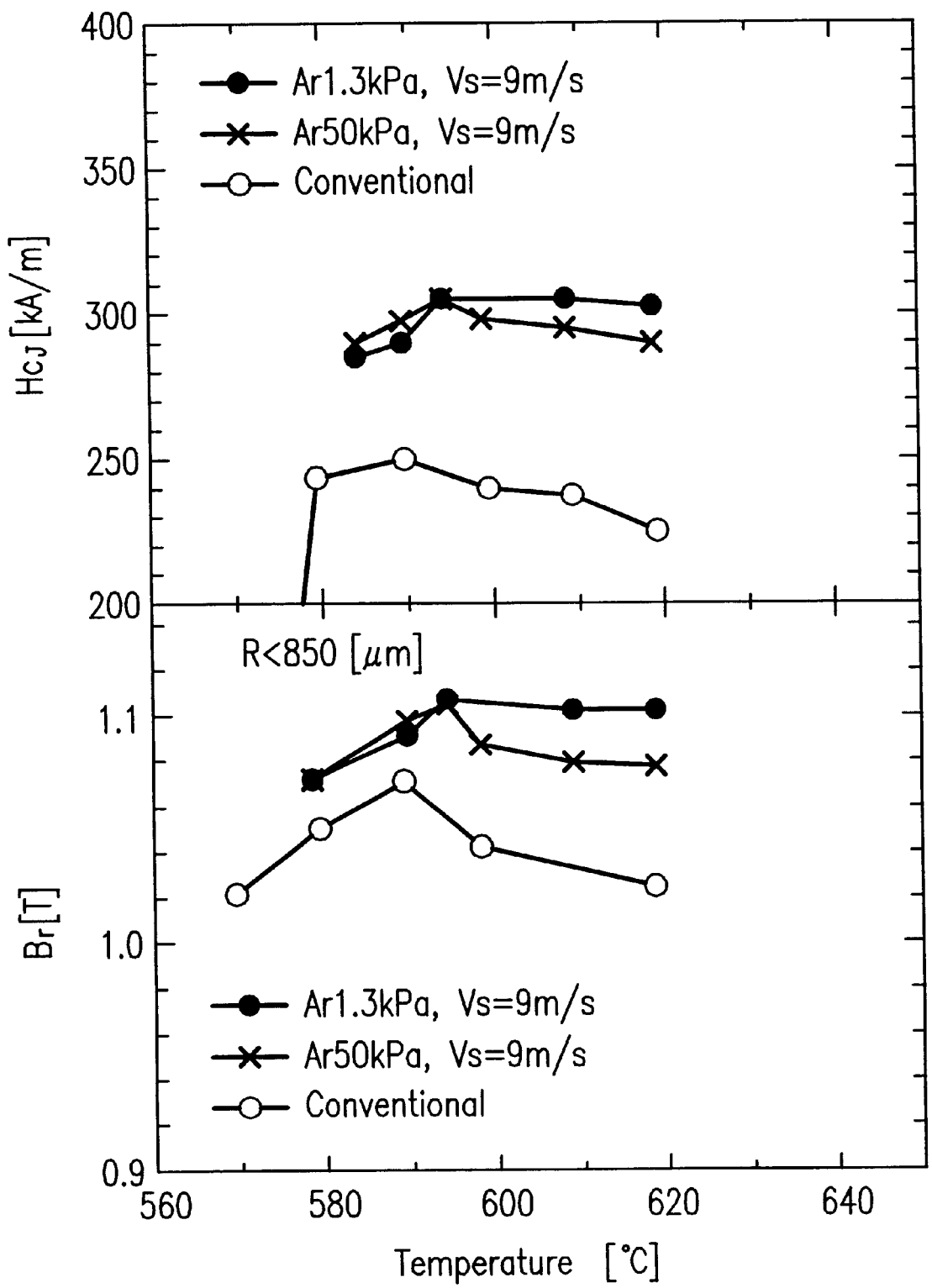
FIG. 7 is a graph illustrating how the coercivity and remanence change depending on the temperature of heat treatment for crystallization.

FIG. 7 is a graph illustrating how the coercivity and remanence of the inventive and conventional material alloys change depending on the temperature of the heat treatment for crystallization. In FIG. 7, the solid circles represent data obtained when the material alloy was rapidly solidified using a roller rotating at a velocity of 9 m/sec. within Ar ambient at a pressure of 1.3 kPa (Example 1). The crosses represent data obtained when the material alloy was rapidly solidified using a roller rotating at a velocity of 9 m/sec. within Ar ambient at a pressure of 50 kPa (Example 2). And the open circles represent data obtained when the material alloy was rapidly solidified using a roller rotating at a velocity of 20 m/sec. within Ar ambient at atmospheric pressure (Comparative Examples).

As shown in FIG. 7, superior magnetic properties are attained by the first and second examples in a broader temperature range compared to the comparative examples.

Figure 8:
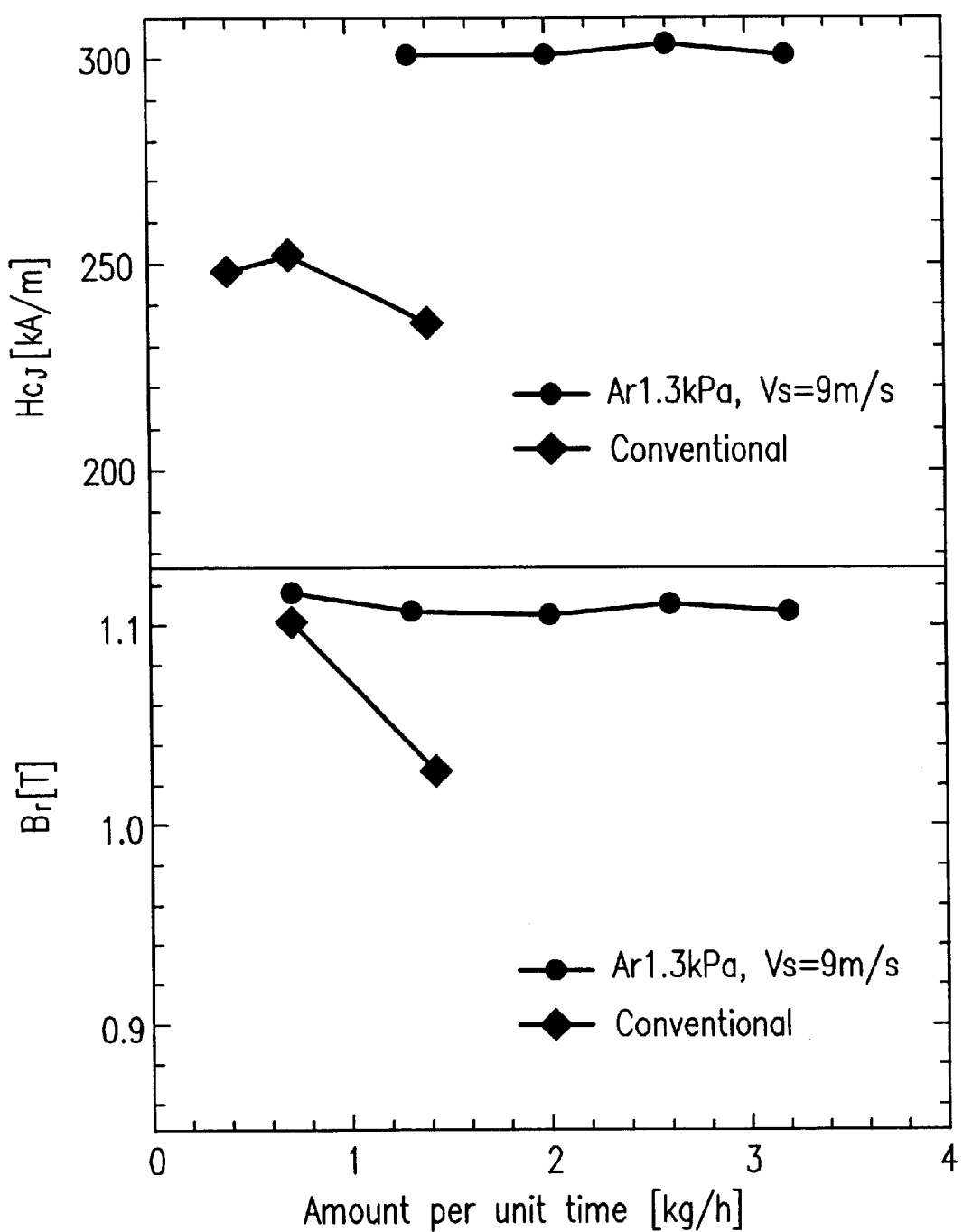
FIG. 8 is a graph illustrating how the coercivity and remanence change depending on the amount of the alloy processed per unit time.

FIG. 8 is a graph illustrating how the coercivity and remanence of the inventive and conventional material alloys change depending on the amount of the molten alloy processed (i.e., rapidly quenched) per unit time. In FIG. 7, the solid circles represent data obtained when the material alloy was rapidly solidified using a roller rotating at a velocity of 9 m/sec. within Ar ambient at a pressure of 1.3 kPa (Example 1). The solid diamonds represent data obtained when the material alloy was rapidly solidified using a roller rotating at a velocity of 20 m/sec. within Ar ambient at atmospheric pressure (Comparative Examples).

As shown in FIG. 8, superior magnetic properties are attained by the first example in a larger amount of the alloy processed as compared to the comparative examples.

Reasons Why the Inventive Alloy Composition is Preferable

In conclusion, it will be described why the alloy composition according to the present invention is preferable.

A rare-earth element R is an element essential for $R_2Fe_{14}B$ exhibiting hard magnetic properties. According to the present invention, R contains at least one of Pr and Nd and optionally another lanthanoid and/or Y. Specifically, 90 atomic percent or more of R is Pr and/or Nd, while the balance (i.e., equal to or larger than 0 atomic percent and less than 10 atomic percent) of R is another lanthanoid and/or Y. At least one of these elements Pr and Nd is indispensable for forming $R_2Fe_{14}B$ exhibiting uniaxial magnetocrystalline anisotropy. Any rare-earth element(s) other than Pr and Nd may be selected when needed. If the molar fraction of R is less than 2 atomic percent, then the resultant coercivity is too small to make the magnet with such a composition actually usable. Nevertheless, if the molar fraction of R exceeds 6 atomic percent, then $Fe_3B$ and $Nd_2Fe_{14}$ phases do not appear and α-Fe phase is prevailing instead, thus considerably decreasing the coercivity. In view of these respects, the molar fraction x of R is preferably in the range from 2 to 6, both inclusive.

B is an element essential for both $Fe_3B$ exhibiting soft magnetic properties and $R_2Fe_{14}B$ exhibiting hard magnetic properties alike. If the molar fraction y of B is out of a range from 16 to 20 atomic percent, then required coercivity is not attainable. Thus, the molar fraction y of B is preferably in the range from 16 to 20 atomic percent, both inclusive. Furthermore, when the B molar fraction is out of this range, the melting point of the alloy rises and therefore the melting temperature needs to be raised. Also, the container should be kept at a higher temperature. In addition, since the volume fraction of amorphous portions also decreases, a desired rapidly-quenched alloy structure cannot be obtained in such a case.

Co raises the Curie temperature, thereby weakening the temperature dependence of magnetic properties and stabilizing the magnetic properties. Also, Co advantageously increases the viscosity of the molten alloy, thus contributing to stabilization of a melt-feeding rate. If the molar fraction of Co added is less than 0.2 atomic percent, then these advantageous effects cannot be attained sufficiently. However, if the Co molar fraction exceeds 7 atomic percent, then the magnetic properties of the resultant quenched alloy start to deteriorate. Accordingly, Co needs to be added only when these effects should be attained, and do not always have to be added to attain the inherent effects of the present invention. Where Co is added, the molar fraction z thereof should meet $0.2 \leq z \leq 7$ because of these reasons.

M is added where the coercivity should be increased as much as possible. If the molar fraction of M added is less than 0.01 atomic percent, then the coercivity does not increase sufficiently. However, if the M molar fraction exceeds 7 atomic percent, then the magnetic properties of the resultant quenched alloy start to deteriorate. Accordingly, where M is added, the molar fraction u thereof should meet $0.01 \leq u \leq 7$ because of these reasons. Examples of M include Cr, Cu, Au and Ag. Among these elements, if Cr is added, then not only coercivity but also wear resistance of the alloy advantageously increase. On the other hand, if Cu, Au or Ag is added, then an appropriate temperature range can be broadened when heat treatment is conducted for the purpose of crystallization.

In the inventive material alloy for nanocomposite magnet, $Fe_3B$ can crystallize at a relatively low temperature because the $Fe_3B$ crystallization proceeds through atomic diffusion over a very short range. In addition, since the temperature range in which $Fe_3B$ crystals grow is different from the temperature range in which $Nd_2Fe_{14}B$ crystals grow, the crystallization of these compounds take place at mutually different time zones during heat treatment. Accordingly, heat of crystallization reaction is dispersed within a broad temperature range and nanometer-scaled crystallites can be formed with good controllability and without generating an excessively large quantity of heat at a time as a result of the crystallization reaction. Thus, the amount of material alloy powder processable by the heat treatment can be increased without deteriorating the resultant magnetic properties.

Furthermore, $Fe_3B$ crystal nuclei are distributed at a high density in the material alloy, and therefore a highly homogeneous nanocrystalline metallic structure can be formed as a result of the heat treatment to produce a magnet. Thus, excellent magnet performance is attainable as well.

According to the inventive method for preparing a material alloy for nanocomposite magnet, the quenching process can be performed to form the alloy under the controllable conditions by using, as indices, peaks of Bragg reflection observable by X-ray diffraction analysis on the alloy. Thus, the cooling rate is easily optimizable or controllable, and it is possible to constantly prepare a material alloy for nanocomposite magnet exhibiting excellent magnetic properties.

If nanocomposite magnet powder is prepared in accordance with the inventive method, a highly homogeneous nanocrystalline metallic structure can be formed with good controllability as a result of the heat treatment to produce a magnet. Thus, a magnet with excellent performance can be provided at a high throughput.

The inventive nanocomposite magnet exhibits excellent magnet properties, thus contributing to the performance enhancement of a motor or actuator.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A material alloy for a nanocomposite magnet, the alloy being represented by a general formula $Fe_{100-x-y}R_xB_y$, $Fe_{100-x-y-z}R_xB_yCo_z$, $Fe_{100-x-y-u}R_xB_yM_u$ or $Fe_{100-x-y-z-u}R_xB_yCo_zM_u$, where R is a rare-earth element, 90 atomic percent or more of R being Pr and/or Nd, while equal to or larger than 0 atomic percent and less than 10 atomic percent of R being another lanthanoid and/or Y, M is at least one element selected from the group consisting of Al, Si, Ti, V, Cr, Mn, Ni, Cu, Ga, Zr, Nb, Mo, Hf, Ta, W, Pt, Pb, Au and Ag, and the molar fractions x, y, z and u meet the inequalities of $2 \leq x \leq 6$, $16 \leq y \leq 20$, $0.2 \leq z \leq 7$ and $0.01 \leq u \leq 7$, respectively, and wherein the alloy includes a metastable phase Z represented by at least one of a plurality of Bragg reflection peaks observable by X-ray diffraction analysis, the at least one peak corresponding to a lattice spacing of 0.179 nm±0.005 nm, an intensity of the Bragg reflection peak representing 5 to 200 percent, both inclusive, of a maximum intensity of a halo pattern, and wherein an intensity of a (110) Bragg reflection peak of body-centered Fe represents less than 5 percent of the maximum intensity of the halo pattern.

2. A material alloy powder for a nanocomposite magnet, the powder being represented by a general formula $Fe_{100-x-y}R_xB_y$, $Fe_{100-x-y-z}R_xB_yCo_z$, $Fe_{100-x-y-u}R_xB_yM_u$ or $Fe_{100-x-y-z-u}R_xB_yCo_zM_u$, where R is a rare-earth element, 90 atomic percent or more of R being Pr and/or Nd, while equal to or larger than 0 atomic percent and less than 10 atomic percent of R being another lanthanoid and/or Y, M is at least one element selected from the group consisting of Al, Si, Ti, V, Cr, Mn, Ni, Cu, Ga, Zr, Nb, Mo, Hf, Ta, W, Pt, Pb, Au and Ag, and the molar fractions x, y, z and u meet the inequalities of $2 \leq x \leq 6$, $16 \leq y \leq 20$, $0.2 \leq z \leq 7$ and $0.01 \leq u \leq 7$, respectively, and wherein the powder includes a metastable phase Z represented by at least one of a plurality of Bragg reflection peaks observable by X-ray diffraction analysis, the at least one peak corresponding to a lattice spacing of 0.179 nm±0.005 nm, an intensity of the Bragg reflection peak representing 5 to 200 percent, both inclusive, of a maximum intensity of a halo pattern, and wherein an intensity of a (110) Bragg reflection peak of body-centered Fe represents less than 5 percent of the maximum intensity of the halo pattern.

3. A method for preparing a material alloy for a nanocomposite magnet, the alloy being represented by a general formula $Fe_{100-x-y}R_xB_y$, $Fe_{100-x-y-z}R_xB_yCo_z$, $Fe_{100-x-y-u}R_xB_yM_u$ or $Fe_{100-x-y-z-u}R_xB_yCo_zM_u$, where R is a rare-earth element; 90 atomic percent or more of R is Pr and/or Nd, while equal to or larger than 0 atomic percent and less than 10 atomic percent of R is another lanthanoid and/or Y; M is at least one element selected from the group consisting of Al, Si, Ti, V, Cr, Mn, Ni, Cu, Ga, Zr, Nb, Mo, Hf, Ta, W, Pt, Pb, Au and Ag; the molar fractions x, y, z and u meet the inequalities of $2 \leq x \leq 6$, $16 \leq y \leq 20$, $0.2 \leq z \leq 7$ and $0.01 \leq u \leq 7$, respectively, the method comprising the steps of forming a melt of the material alloy, and rapidly quenching and solidifying the melt, wherein a cooling rate of the alloy is adjusted in the rapid quenching and solidifying step such that the material alloy solidified includes a metastable phase Z represented by at least one of a plurality of Bragg reflection peaks observable by X-ray diffraction analysis, the at least one peak corresponding to a lattice spacing of 0.179 nm±0.005 nm, an intensity of the Bragg reflection peak representing 5 to 200 percent, both inclusive, of a maximum intensity of a halo pattern, an intensity of a (110) Bragg reflection peak of body-centered Fe representing less than 5 percent of the maximum intensity of the halo pattern.

4. A method according to claim 3, further comprising the step of making powder out of the rapidly-solidified material alloy.

5. A method according to claim 3, wherein in the rapid quenching and solidifying step, a cooling rate of the alloy is defined within the range from $5 \times 10^4$ K/s to $5 \times 10^6$ K/s, and wherein a temperature of the quenched alloy is lower by 400 to 800° C. than a temperature $T_m$ of the molten alloy yet to be quenched.

6. A method according to claim 5 wherein the rapid quenching and solidifying step is performed within a low-pressure ambient.

7. A method according to claim 5 or 6 wherein an absolute pressure of the low-pressure ambient is 50 kPa or less.

8. A method for preparing nanocomposite magnet powder, the method comprising the steps of:

preparing material alloy powder for a nanocomposite magnet, the powder being represented by a general formula $Fe_{100-x-y}R_xB_y$, $Fe_{100-x-y-z}R_xB_yCo_z$, $Fe_{100-x-y-u}R_xB_yM_u$ or $Fe_{100-x-y-z-u}R_xB_yCo_zM_u$, where R is a rare-earth element; 90 atomic percent or more of R is Pr and/or Nd, while equal to or larger than 0 atomic percent and less than 10 atomic percent of R is another lanthanoid and/or Y; M is at least one element selected from the group consisting of Al, Si, Ti, V, Cr, Mn, Ni, Cu, Ga, Zr, Nb, Mo, Hf, Ta, W, Pt, Pb, Au and Ag; the molar fractions x, y, z and u meet the inequalities of $2 \leq x \leq 6$, $16 \leq y \leq 20$, $0.2 \leq z \leq 7$ and $0.01 \leq u \leq 7$, respectively, the powder including a metastable phase Z represented by at least one of a plurality of Bragg reflection peaks observable by X-ray diffraction analysis, the at least one peak corresponding to a lattice spacing of 0.179 nm±0.005 nm, an intensity of the Bragg reflection peak representing 5 to 200 percent, both inclusive, of a maximum intensity of a halo pattern, an intensity of a (110) Bragg reflection peak of body-centered Fe representing less than 5 percent of the maximum intensity of the halo pattern, and heat-treating the material alloy powder for the nanocomposite magnet, thereby crystallizing $Fe_3B$ and Fe—R—B compounds.

9. A method according to claim 8, wherein the step of preparing the material alloy powder for the nanocomposite magnet comprises the steps of:

forming a melt of the material alloy;

rapidly quenching and solidifying the melt;

crushing the rapidly-solidified material alloy; and pulverizing the material alloy, and wherein in the rapid quenching and solidifying step, a cooling rate of the alloy is defined within the range from $5 \times 10^4$ K/s to $5 \times 10^6$ K/s, and wherein a temperature of the quenched alloy is lower by 400 to 800° C. than a temperature $T_m$ of the molten alloy yet to be quenched.

10. A method for producing a nanocomposite magnet, the method comprising the steps of preparing material alloy powder for the nanocomposite magnet, the powder being represented by a general formula $Fe_{100-x-y}R_xB_y$, $Fe_{100-x-y-z}R_xB_yCo_z$, $Fe_{100-x-y-u}R_xB_yM_u$ or $Fe_{100-x-y-z-u}R_xB_yCo_zM_u$, where R is a rare-earth element; 90 atomic percent or more of R is Pr and/or Nd, while equal to or larger than 0 atomic percent and less than 10 atomic percent of R is another lanthanoid and/or Y; M is at least one element selected from the group consisting of Al, Si, Ti, V, Cr, Mn, Ni, Cu, Ga, Zr, Nb, Mo, Hf, Ta, W, Pt, Pb, Au and Ag; the molar fractions x, y, z and u meet the inequalities of $2 \leq x \leq 6$, $16 \leq y \leq 20$, $0.2 \leq z \leq 7$ and $0.01 \leq u \leq 7$, respectively, the powder including a metastable phase Z represented by at least one of a plurality of Bragg reflection peaks observable by X-ray diffraction analysis, the at least one peak corresponding to a lattice spacing of 0.179 nm±0.005 nm, an intensity of the Bragg reflection peak representing 5 to 200 percent, both inclusive, of a maximum intensity of a halo pattern, an intensity of a (110) Bragg reflection peak of body-centered Fe representing less than 5 percent of the maximum intensity of the halo pattern, heat-treating the material alloy powder for the nanocomposite magnet, thereby crystallizing $Fe_3B$ and Fe—R—B compounds, and molding the heat-treated material alloy powder.

11. A method according to claim 10, wherein the step of preparing the material alloy powder for the nanocomposite magnet comprises the steps of:

forming a melt of the material alloy;

rapidly quenching and solidifying the melt;

crushing the rapidly-solidified material alloy; and pulverizing the material alloy, and wherein in the rapid quenching and solidifying step, a cooling rate of the alloy is defined within the range from $5 \times 10^4$ K/s to $5 \times 10^6$ K/s, and wherein a temperature of the quenched alloy is lower by 400 to 800° C. than a temperature $T_m$ of the molten alloy yet to be quenched.

12. A method according to claim 11, wherein the step of rapidly quenching and solidifying the melt is performed within a low-pressure ambient.

13. A method according to claim 12, wherein an absolute pressure of the low-pressure ambient is 50 kPa or less.

14. A method according to one of claims 10 to 13, wherein the step of molding the powder comprises producing a bonded magnet out of the heat-treated material alloy powder.

15. A motor comprising a nanocomposite magnet produced by the method as recited in one of claims 10 to 13.

16. A motor comprising a nanocomposite magnet produced by the method as recited in claim 14.

* * * * *